(12) United States Patent
Baschnagel

(10) Patent No.: US 9,712,652 B2
(45) Date of Patent: Jul. 18, 2017

(54) FLEXIBLE CABLE FOR SUPPORTING ITSELF OR AN ELECTRONIC DEVICE ELECTRICALLY CONNECTED THRERETO

(71) Applicant: Robert Baschnagel, Garden City, NY (US)

(72) Inventor: Robert Baschnagel, Garden City, NY (US)

(*) Notice: Subject to any disclaimer, the term of this patent is extended or adjusted under 35 U.S.C. 154(b) by 14 days.

(21) Appl. No.: 14/289,620

(22) Filed: May 28, 2014

(65) Prior Publication Data
US 2014/0274221 A1 Sep. 18, 2014

Related U.S. Application Data

(63) Continuation-in-part of application No. 13/941,664, filed on Jul. 15, 2013, which is a continuation-in-part of application No. 13/766,387, filed on Feb. 13, 2013, now abandoned.

(51) Int. Cl.

| | |
|---|---|
| *H04M 1/00* | (2006.01) |
| *H04B 1/38* | (2015.01) |
| *H04M 1/02* | (2006.01) |
| *H04B 1/3883* | (2015.01) |
| *H04B 1/3877* | (2015.01) |
| *H02G 11/00* | (2006.01) |
| *H04M 1/04* | (2006.01) |

(52) U.S. Cl.
CPC ........ *H04M 1/0274* (2013.01); *H04B 1/3877* (2013.01); *H04B 1/3883* (2013.01); *H02G 11/00* (2013.01); *H04M 1/04* (2013.01); *H04M 2001/0204* (2013.01)

(58) Field of Classification Search
CPC .............. H04M 1/274; H04M 1/04; H04M 2001/0204; H04B 1/3877; H04B 1/3883
USPC .................... 455/90.1, 90.3, 550.1, 573
See application file for complete search history.

(56) References Cited

U.S. PATENT DOCUMENTS

| | | | |
|---|---|---|---|
| 6,280,050 B1* | 8/2001 | Bird | F21V 21/32 |
| | | | 362/191 |
| 6,580,949 B1* | 6/2003 | Tsuboi | A61N 1/056 |
| | | | 607/119 |
| 8,952,659 B2* | 2/2015 | Tao et al. | 320/114 |
| 8,974,242 B2* | 3/2015 | Lee | H01R 13/5833 |
| | | | 439/278 |
| 2012/0080440 A1* | 4/2012 | McClees | A45C 1/024 |
| | | | 220/751 |
| 2013/0335003 A1* | 12/2013 | Buhler et al. | 320/103 |
| 2014/0076626 A1* | 3/2014 | Wang | 174/74 R |

* cited by examiner

*Primary Examiner* — Nhan Le

(57) ABSTRACT

A cable including: a body having one or more elongated conductors and an electrically insulating sheathing covering the elongated conductor; and a connector disposed at at least one end for electrically connecting the elongated conductor to an electronic device; wherein at least a portion of the body has a rigidity such that the portion can be shaped into a predetermined configuration and maintained in the predetermined configuration when one or more of supporting the electronic device in a predetermined position or maintaining the body into a predetermined configuration.

8 Claims, 36 Drawing Sheets

FLEXIBLE CABLE FOR SUPPORTING ITSELF OR AN ELECTRONIC DEVICE ELECTRICALLY CONNECTED THRERETO

CROSS-REFERENCE

This application is a continuation-in-part Application of U.S. application Ser. No. 13/941,664 filed on Jul. 15, 2013, which is a continuation-in-part of U.S. application Ser. No. 13/766,387, filed on Feb. 13, 2013, the entirety of each of which are hereby incorporated by reference.

BACKGROUND OF THE INVENTION

1. Field of the Invention

This invention relates generally to cables for use with electronic devices and more particularly to cables for electronic devices that include at least one connector for connecting to the electronic device and at least a portion of the cable being capable of being bent into a predetermined shape and retaining such shape support with either itself or the electronic device.

2. Prior Art

Cables, such as those having a Universal Serial Bus ("USB" hereinafter) connector or headphones jack or smartphone connectors for electronic devices, such as a cell phone, are known in the prior art. Nevertheless, such cables cannot support the electronic device in a predetermined position/orientation (referred to hereinafter as simply "position"), such as supporting the cell phone in a standing position while it is being charged or synchronized. Electronic devices are defined herein as including but are not limited to mobile phones, smart phones, and multimedia players. Furthermore, such cables are also incapable of supporting itself in a predetermined position.

SUMMARY OF THE INVENTION

Accordingly, a cable is provided. The cable comprising: a body having one or more elongated conductors and an electrically insulating sheathing covering the elongated conductor; and a connector disposed at at least one end for electrically connecting the elongated conductor to an electronic device; wherein at least a portion of the body has a rigidity such that the portion can be shaped into a predetermined configuration and maintained in the predetermined configuration when one or more of supporting the electronic device in a predetermined position or maintaining the body into a predetermined configuration.

The electronic device can be a cell phone in which case the connector can be a cell phone connector for one of charging an internal battery of the cell phone or connecting the cell phone to another electronic device.

The connector can be a headphone jack for connecting to a mating headphone connector on the electronic device. Another end of the body can include one or more ear buds for reproducing sound from the electronic device.

The at least a portion of the body can be proximate to the connector.

The at least a portion of the body can be an entire length of the body in a longitudinal direction.

The at least a portion of the body can be a metallic wire spirally wound around the elongated conductor.

The cable can further comprise another connector disposed at another end of the body for connecting to one of the same or a different electronic device.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION OF THE PREFERRED EMBODIMENT

Figure 1:
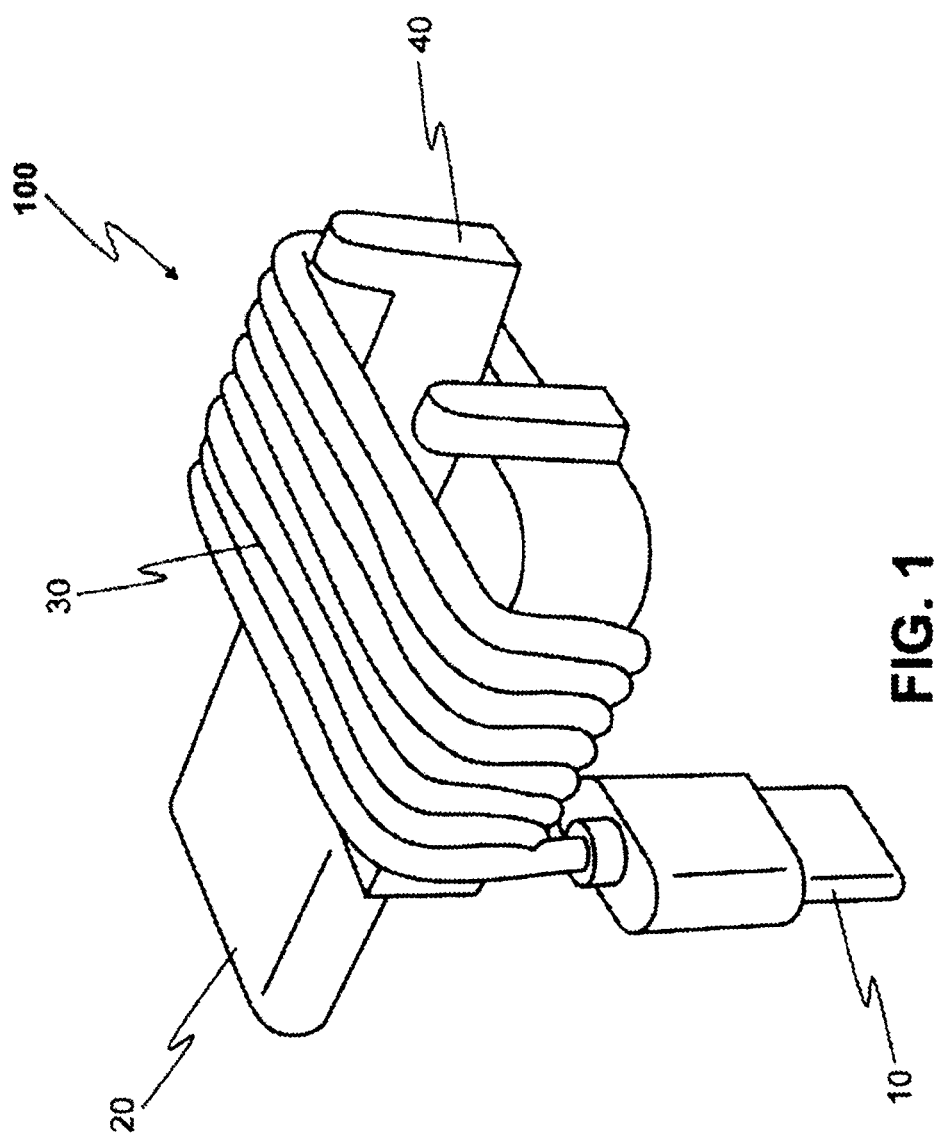
FIG. 1 is a perspective view of a flex and stay charging stand in a stowed position according to one embodiment of the present invention.
Figure 2:
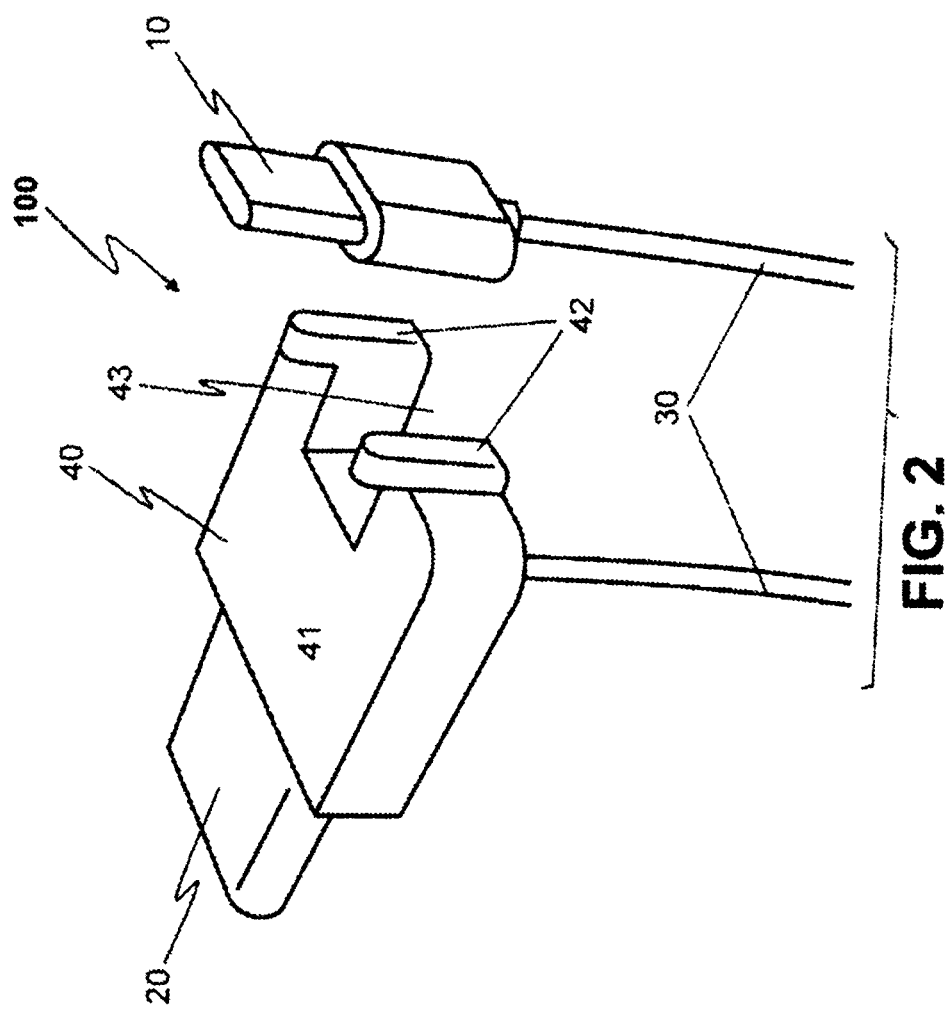
FIG. 2 is a perspective view of the embodiment of the flex and stay charging stand of FIG. 1 in a ready to use position.

Referring to FIG. 1, there is disclosed a flex and stay cell phone/electronic device charging stand 100 according to one embodiment of the present invention in a stowed position. Similar to a typical USB cable for charging a cell phone/electronic device, the flex and stay charging stand 100 of the present invention in this embodiment has a USB plug 10 at its front end for connecting to a USB port on a cell phone, another USB plug 20 at its back end for connecting to a USB port on a charger or a computer, and cord 30. In addition, the embodiment 100 has a docking station 40 for receiving a cell phone/electronic device so when the cell phone/electronic device is being charged it can sit next to the wall outlet with an easy way to access said cell phone/electronic device. FIG. 2 is a perspective view of the embodiment of the flex and stay charging stand of FIG. 1 in a ready to use position. The docking station 40 in this embodiment comprises a substantially U-shaped base 41 and two vertical bars 42 which protrude upwards at the front of the base. The base 41 holds the bottom of the cell phone and the two vertical bars 42 hold the front of the cell phone. The substantially U-shaped slot 43 is defined at the front of the base 41 and is configured to match the front-end USB plug 10 so that when the front-end USS plug 10 is inserted into the USB port of the cell phone it can snugly fit in the U-shaped slot 43 while the cell phone is standing within the docking station 40. The shape of the base 41 or the front-end plug receiving slot 43 may vary in other embodiments.

Figure 3:
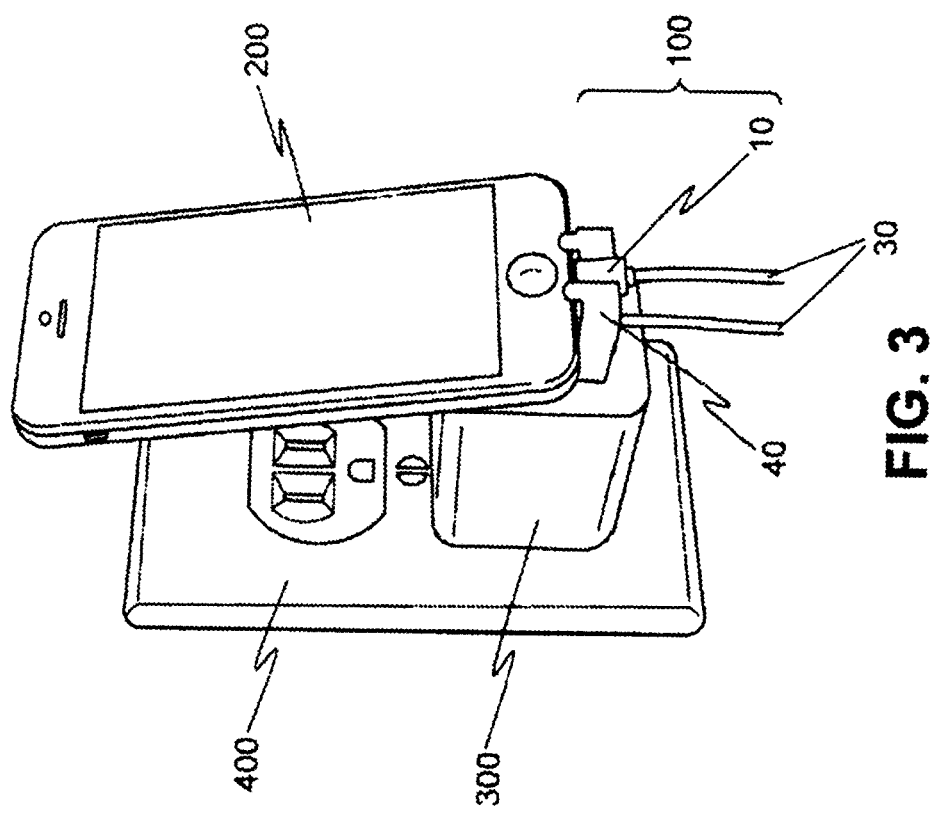
FIG. 3 is an isometric view of the embodiment of the flex and stay charging stand of FIGS. 1 and 2 in operation, mounted on a wall charger and accommodating a cell phone.
Figure 4:
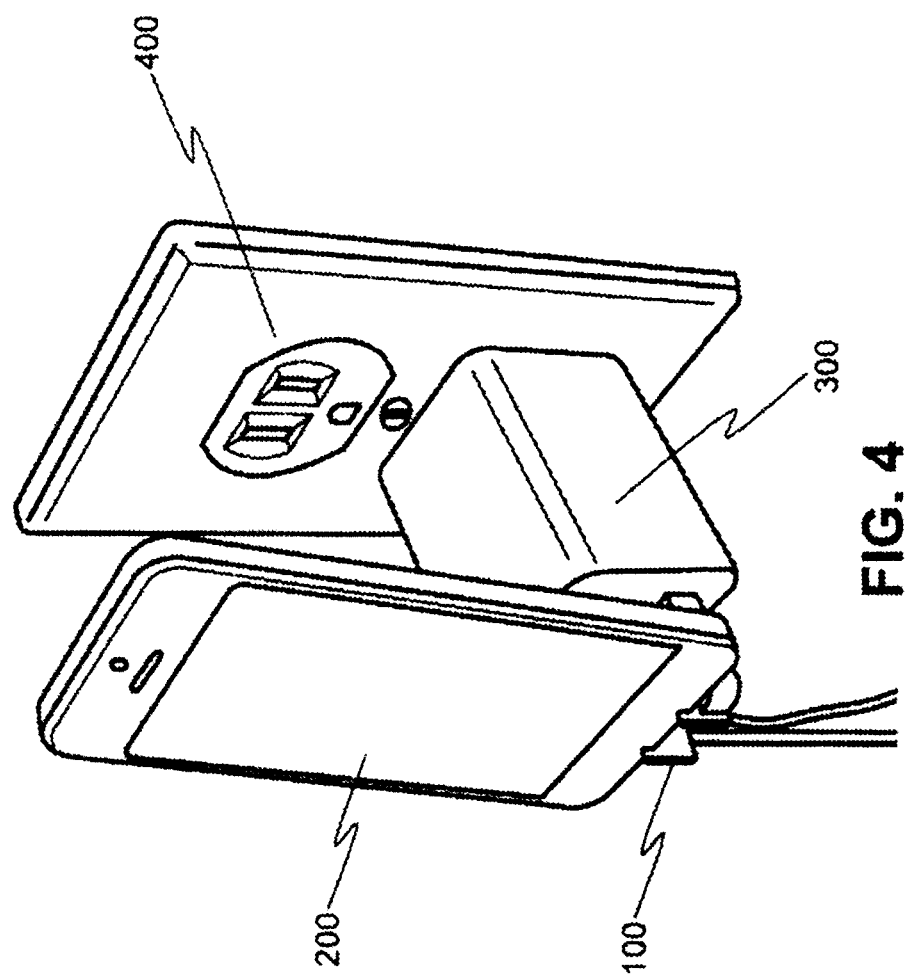
FIG. 4 is an isometric view of the embodiment of the flex and stay charging stand of FIGS. 1 and 2 in operation, mounted on a wall charger and accommodating a cell phone.
Figure 5:
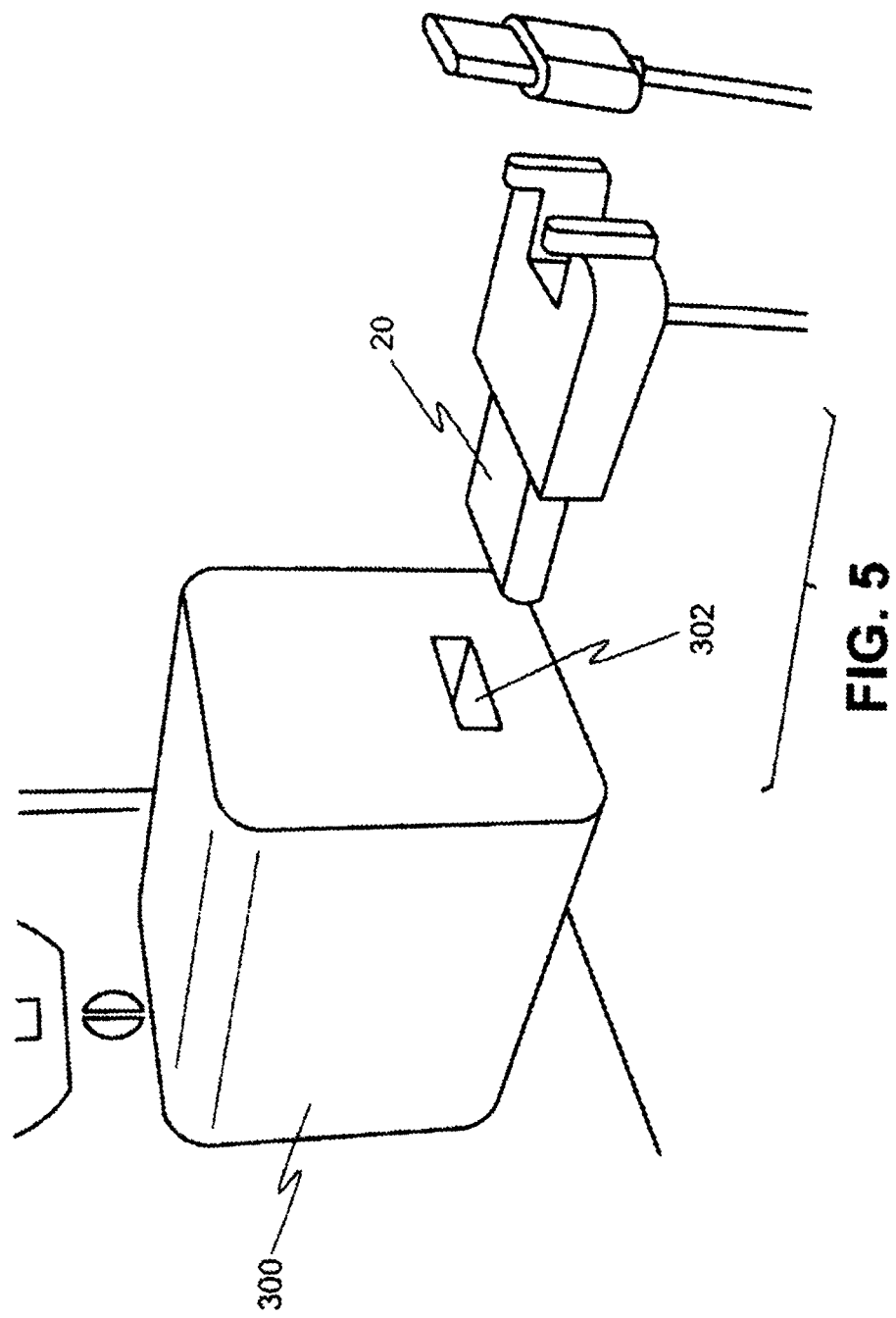
FIG. 5 is an isometric view of the embodiment of the flex and stay charging stand of FIGS. 1 and 2 ready to plug into the wall charger which is plugged into the wall outlet.
Figure 6:
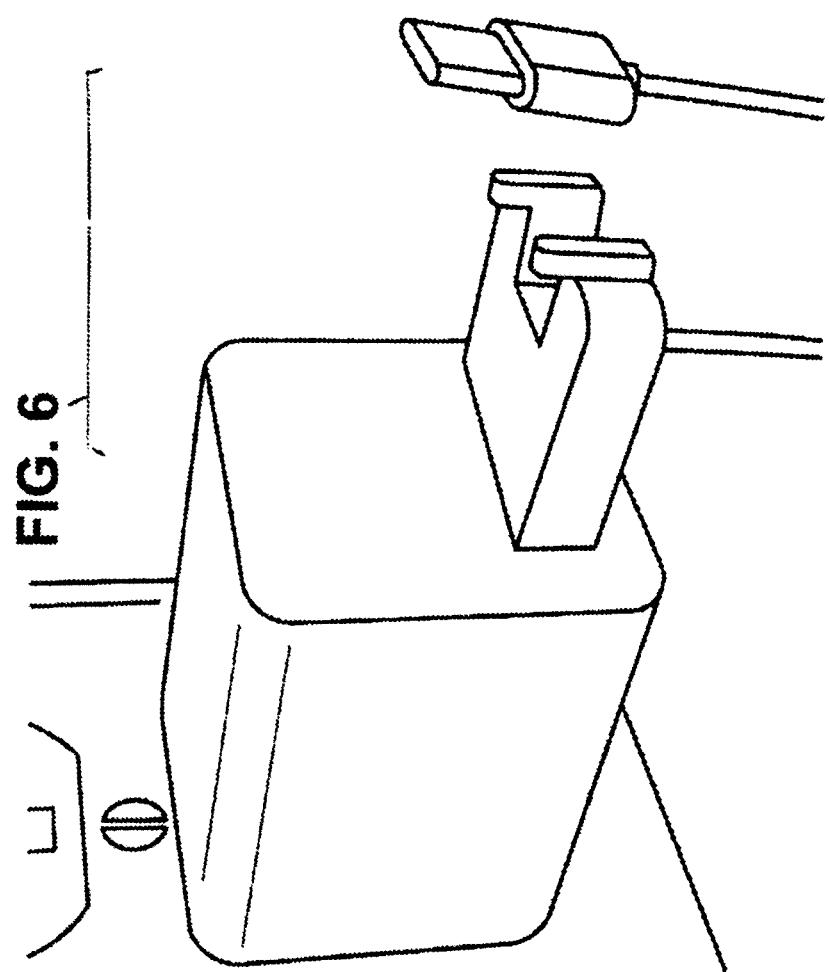
FIG. 6 is an isometric view of the embodiment of the flex and stay charging stand of FIGS. 1 and 2 which is mounted to the charger 300 via the USB plug at the back end.
Figure 7:
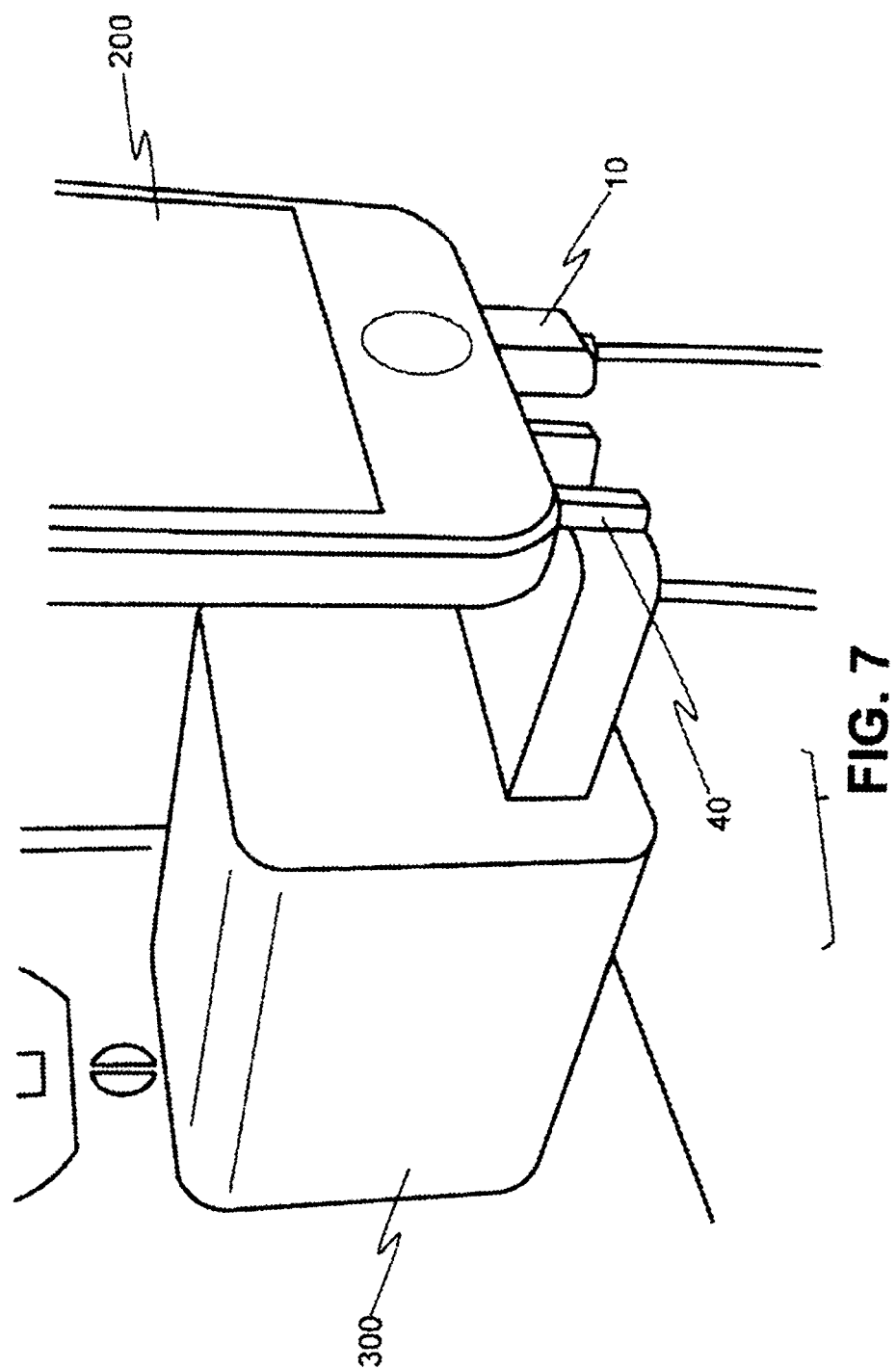
FIG. 7 illustrates an isometric view of the embodiment of the flex and stay charging stand of FIGS. 1 and 2 wherein the front-end USB plug of the device is connected to the cell phone before the cell phone is put on the docking station.
Figure 8:
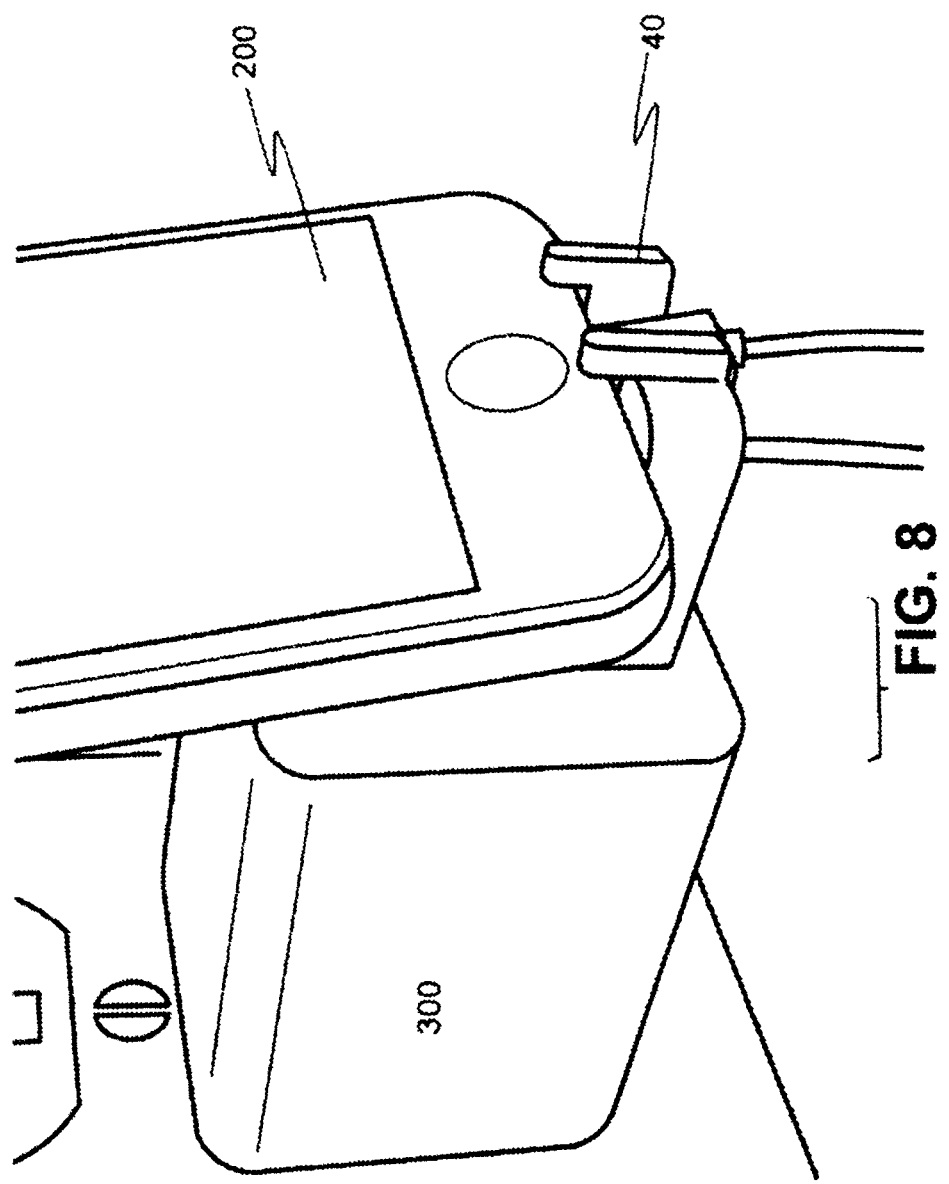
FIG. 8 is an isometric view of the embodiment of the flex and stay charging stand of FIGS. 1 and 2 which is connected to the cell phone and holds the cell phone on its docking station so the cell phone is next to the wall charger and easy to access for use"
Figure 9:
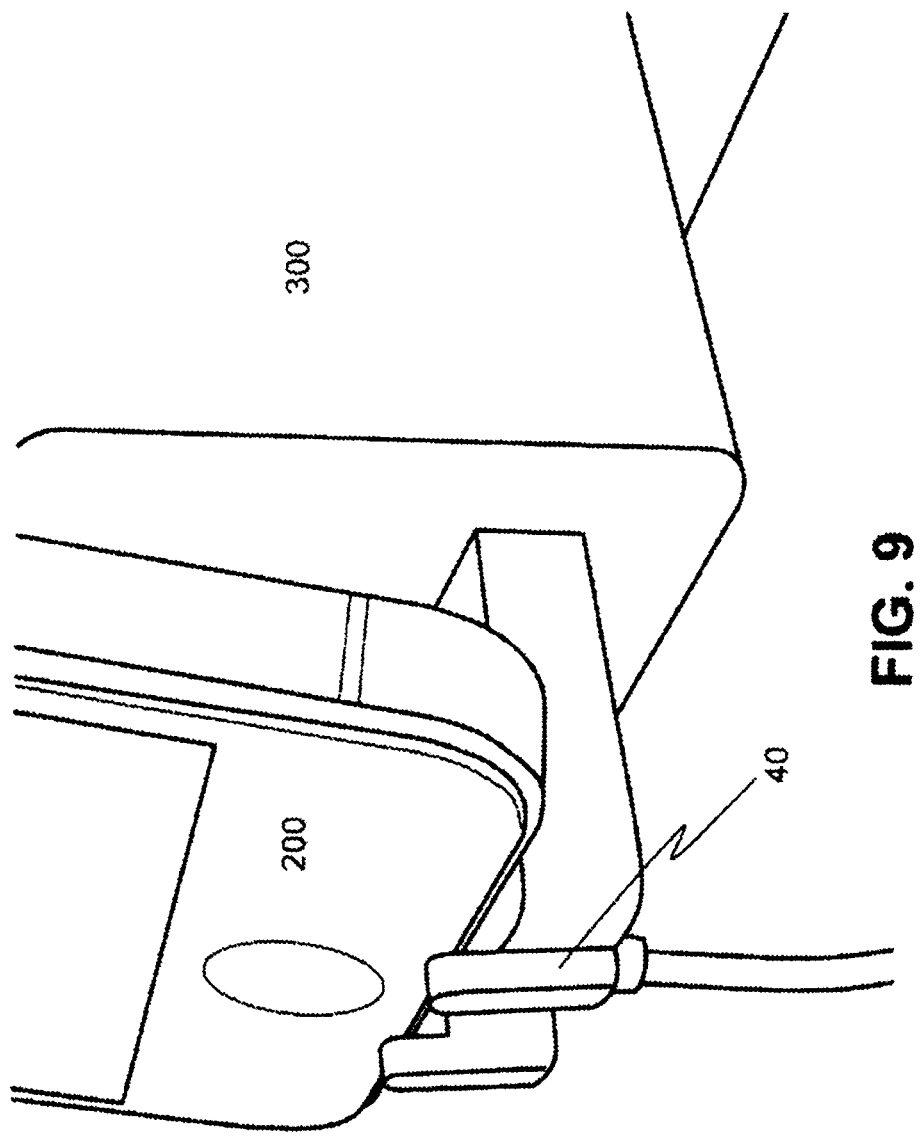
FIG. 9 is another isometric view of the embodiment of the flex and stay charging stand of FIGS. 1 and 2 which is connected to the cell phone and holds the cell phone on its docking station so the cell phone is next to the wall charger and easy to access for use.
Figure 10:
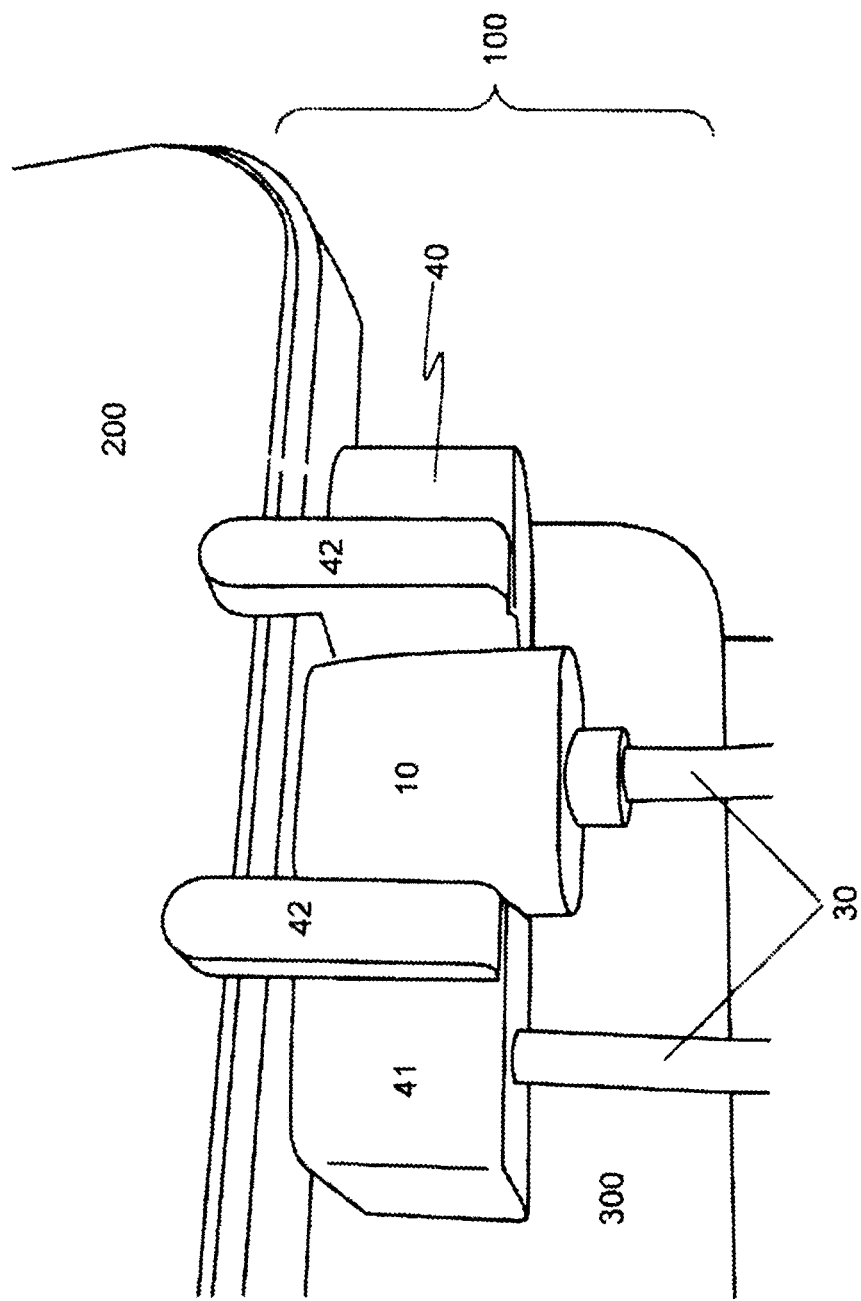
FIG. 10 is another isometric view of the embodiment of the flex and stay charging stand of FIGS. 1 and 2 which is connected to the cell phone and holds the cell phone on its docking station so the cell phone is next to the wall charger and easy to access for use.

FIGS. 3-4 illustrate the embodiment 100 in operation wherein the cell phone 200 sits on the docket station 40 of the device 100 while it is charged by the charger 300 which is plugged into the wall outlet 400. The USB plug at the front end 10 is connected to the cell phone 200 and the USB plug at the back end 20 (not observable in FIGS. 2-3) is connected to the charger 300 which is plugged into the wall outlet 400. FIG. 5 is an isometric view of the embodiment of the flex and stay charging stand of FIGS. 1 and 2 ready to plug into the wall charger which is plugged into the wall outlet. In this figure, the USB plug at the back end 20 of the flex and stay charging stand 100 is ready to insert into the USB port 302 of the charger 300. In FIG. 6, the flex and stay charging stand 100 is mounted to the charger 300 via the USB plug at the back end 20 (not observable in FIG. 6). FIG. 7 illustrates an isometric view of the flex and stay charging stand 100 having the front-end USB plug 10 connected to the cell phone 200 before the cell phone is put on the docking station 40. FIGS. 8-10 show the cell phone 200 sitting on the docking station 40 of the flex and stay charging stand and leaning against the charger 300. FIG. 10 clearly shows that the front-end USB 10 when plugged into the USB port on the cell phone 200, it snugly fits into the substantially U-shaped slot 43 of the docking station 40 and the cell phone 200 is securely held in place by the base 41 and two bars 42 of the docking station 40.

Figure 11:
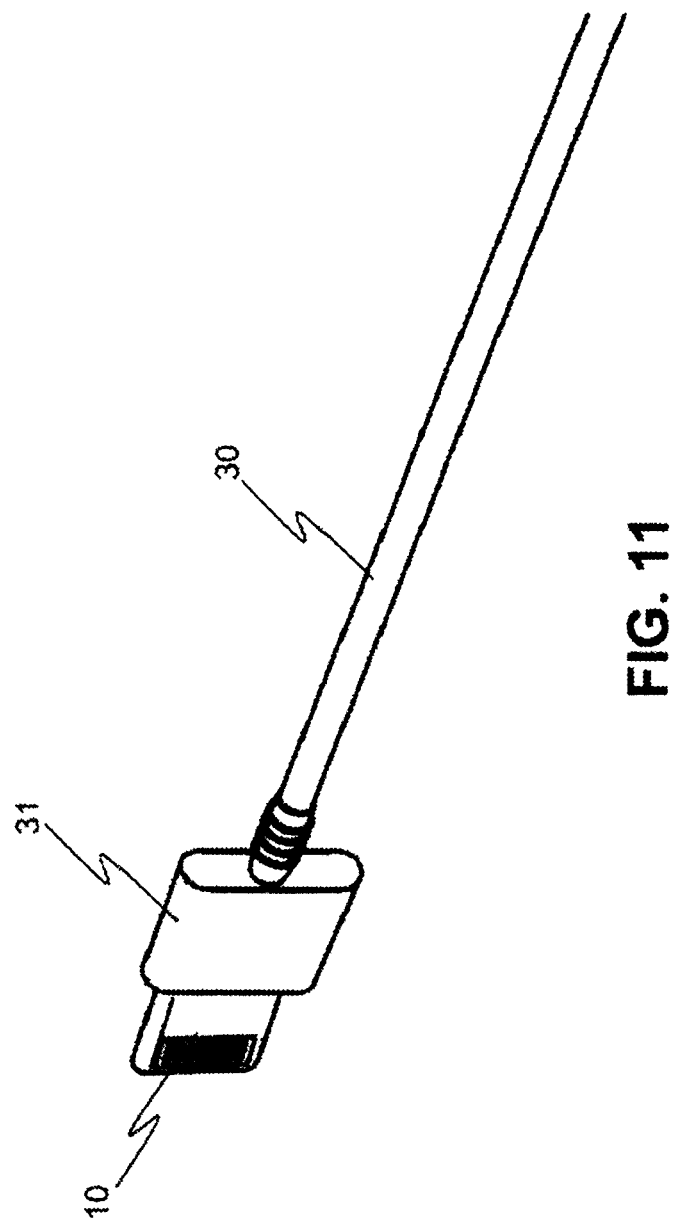
FIG. 11 shows the front end of the flex and stay cell phone/electronic device charging stand including the front-end USB plug 10 for connecting to the cell phone/electronic device and the front of the USB cord 20.
Figure 12:
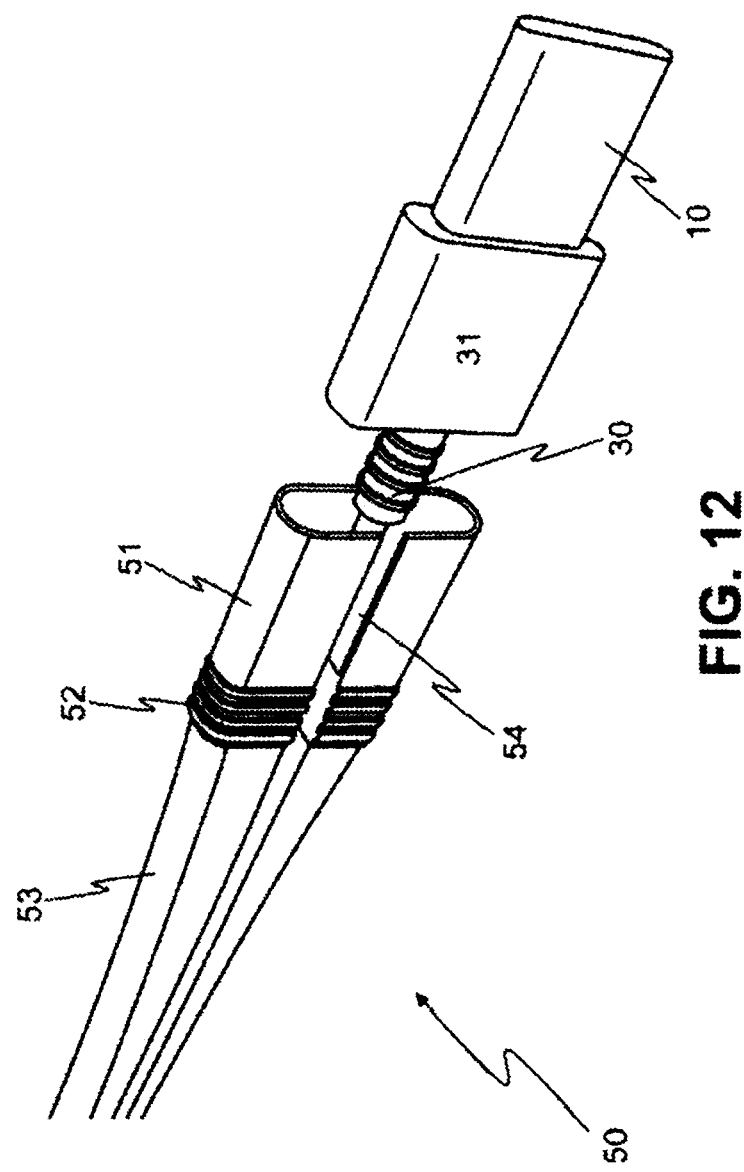
FIG. 12 is the rear view of the removably attachable sleeve which partially encircles the USB cord.
Figure 13:
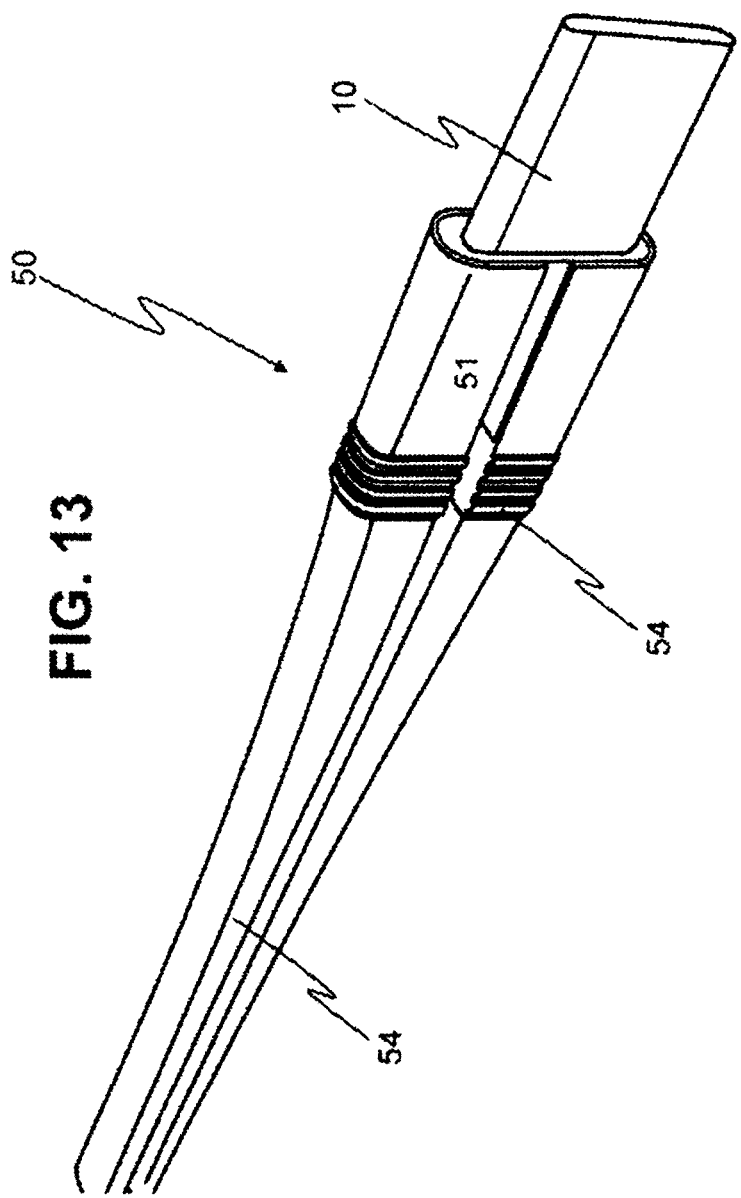
FIG. 13 is the rear view of the rear view of the removably attachable sleeve which completely encircles the front end of the USB cord.

The flex and stay cell phone/electronic device charging stand further comprises a removably attachable sleeve that is designed to encircle the front end of the USB cord thereby enables the USS cable to flex and stay in a bent position. This allows the user of the flex and stay charging stand of the present invention to create a stand for his or her cell phone/electronic device for ease of use on a table or on a flat surface. FIG. 11 shows the front end of the flex and stay cell phone/electronic device charging stand 100 including the front-end USB plug 10 for connecting to the cell phone/electronic device and the front of the USB cord 30 which includes the base of the front-end USB plug 31. FIG. 12 shows the rear view of the removably attachable sleeve 50 partially encircles the USB cord 30 and FIG. 13 shows the rear view of the removably attachable sleeve 50 completely encircles the front end of the USB cord 30 (not observable in FIG. 13). The removably attachable sleeve 50 has a rigid front region 51 for encircling the base of the front-end USS plug 31 and a flex region 52 for circling the front end of the cord 30, and a another rigid region 53 for encircling the middle part of the cord 30. The removably attachable sleeve 50 of the present invention can be bent at the flex region 52 to any desired angle by a user to create a stand to support the cell phone. The removably attachable sleeve 50 has a groove 54 on its rear side along the length to allow the USB cord 30 to insert thereinto.

Figure 14:
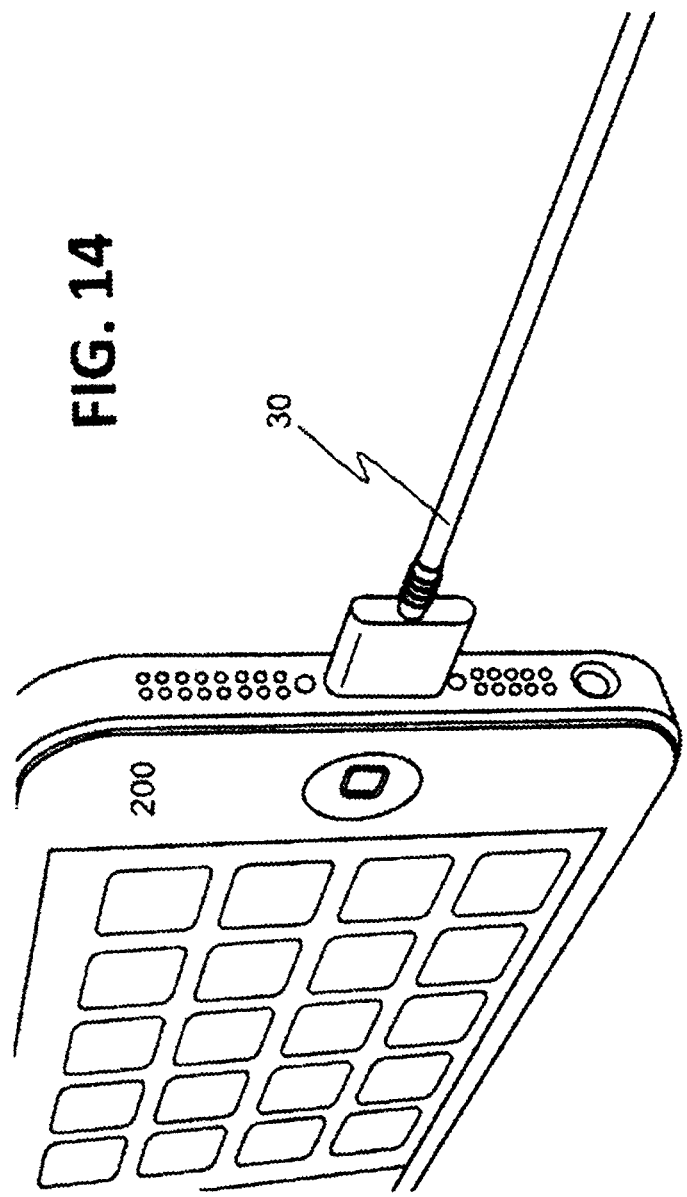
FIG. 14 is an isometric front view of a typical USB cable connected to a cell phone.
Figure 15:
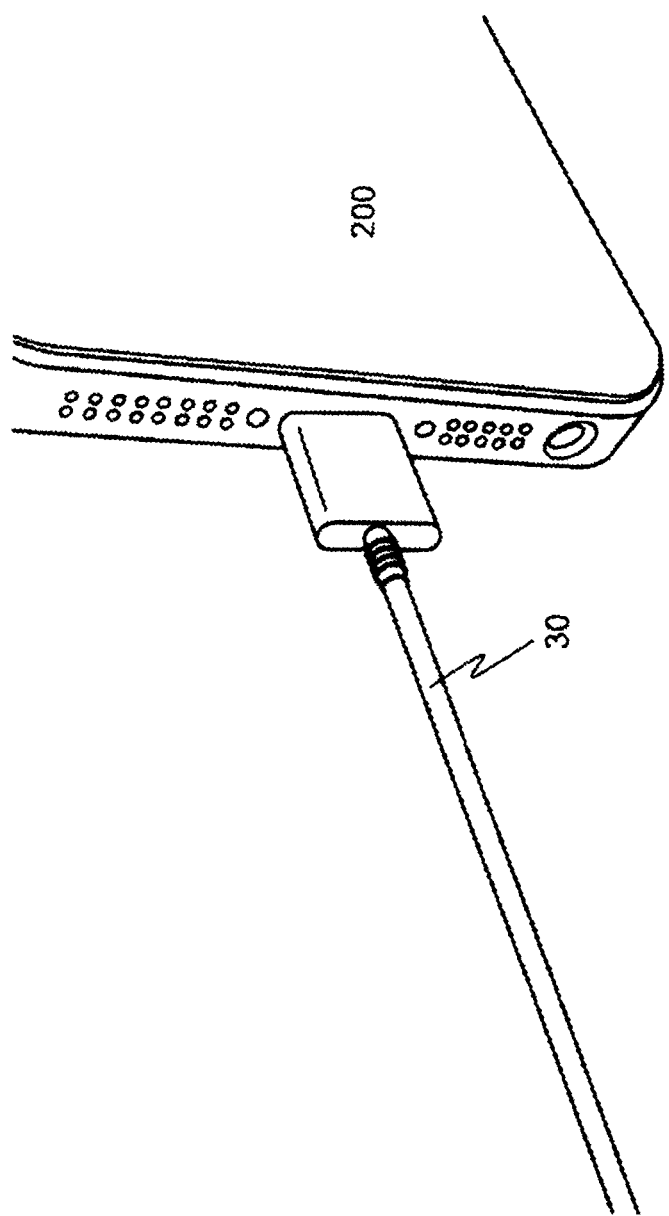
FIG. 15 is an isometric rear view of a typical USB cable connected to a cell phone.
Figure 16:
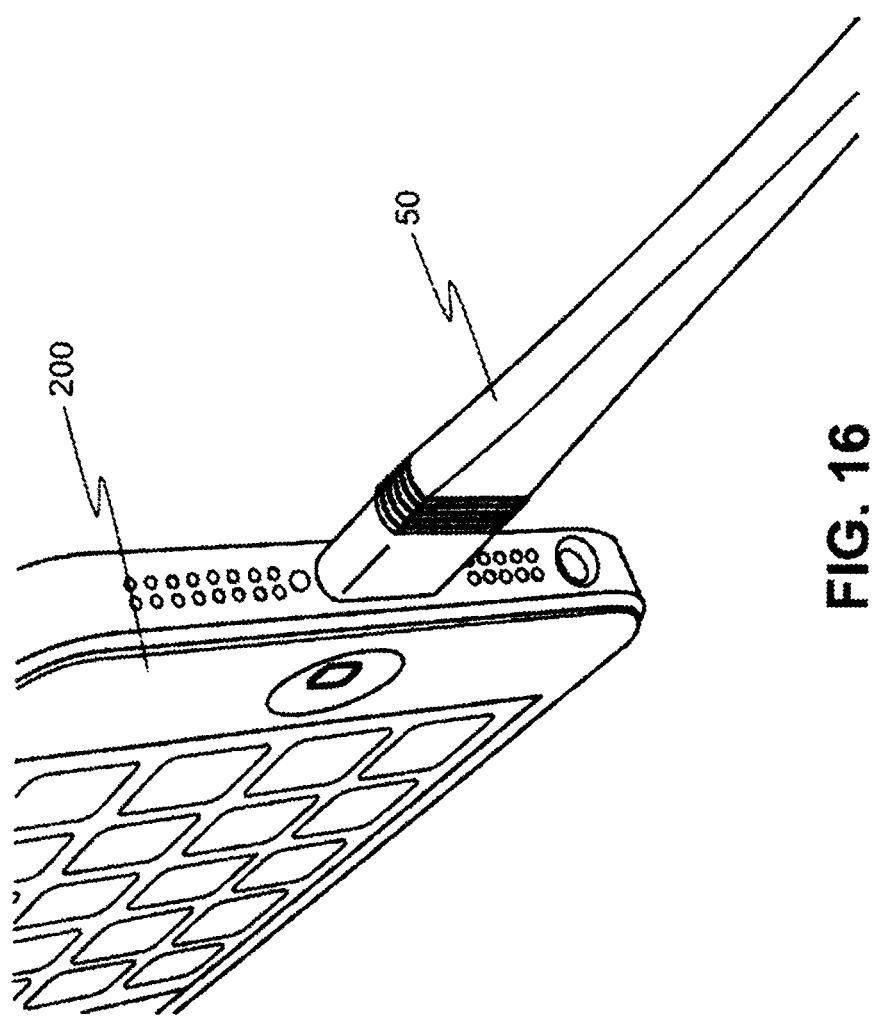
FIG. 16 is an isometric front view of a flex and stay cell phone/electronic device charging stand connected to a cell phone in a straight position.
Figure 17:
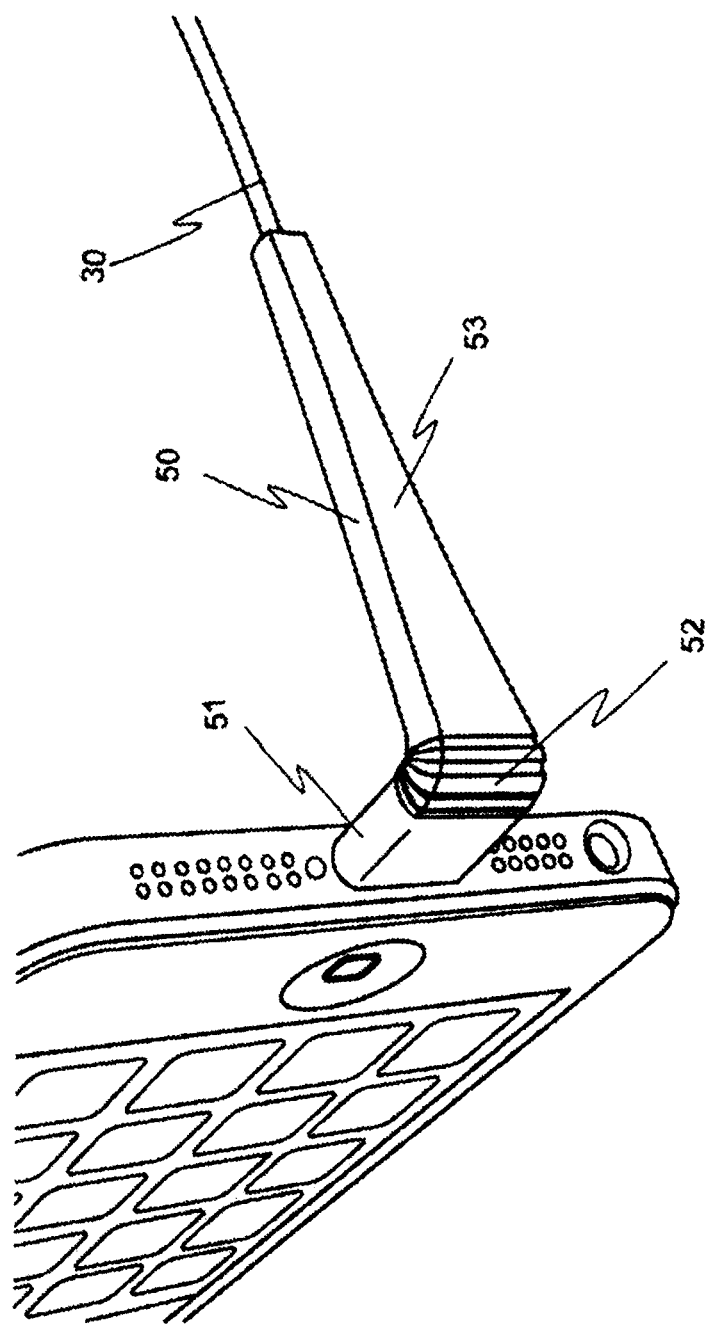
FIG. 17 is an isometric front view of a flex and stay cell phone/electronic device charging stand connected to a cell phone wherein the sleeve attached UBS cord is bent in about 90 degree angle.
Figure 18:
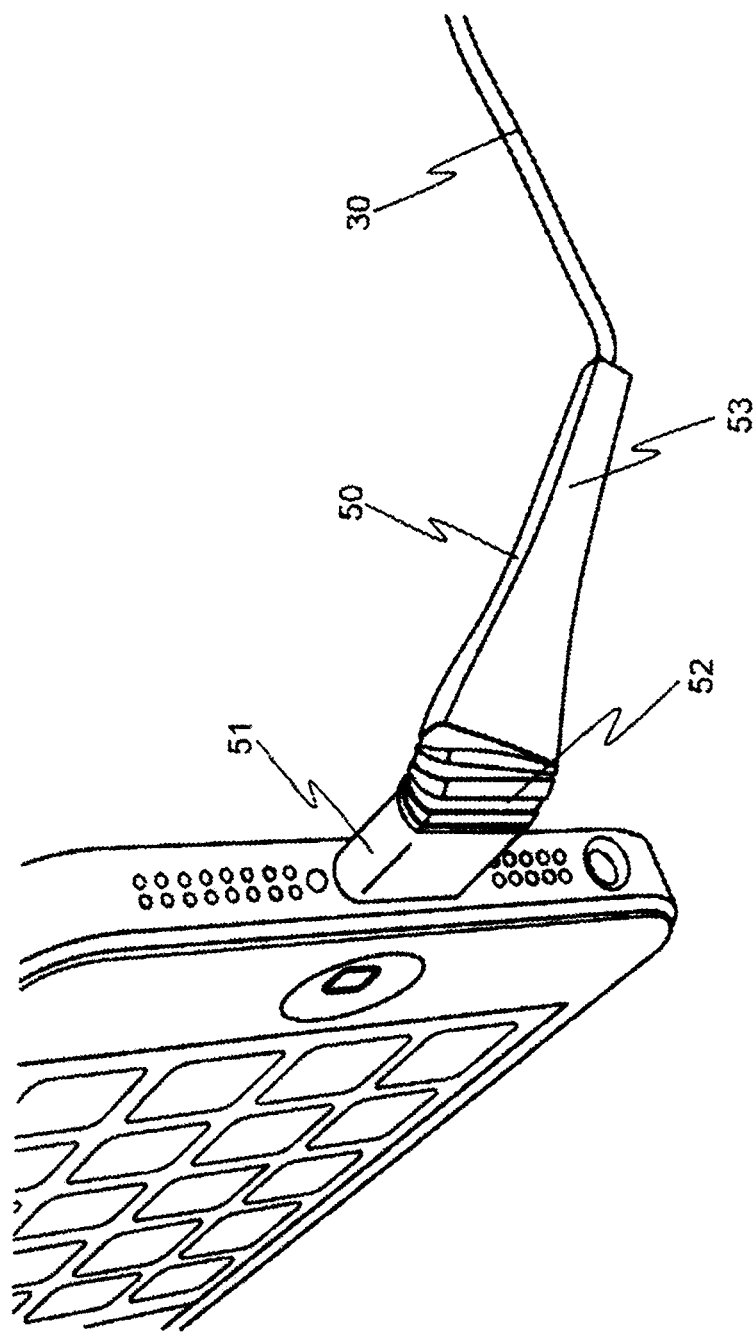
FIG. 18 is an isometric front view of a flex and stay cell phone/electronic device charging stand connected to a cell phone wherein the sleeve attached UBS cord is bent towards the flat surface.
Figure 19:
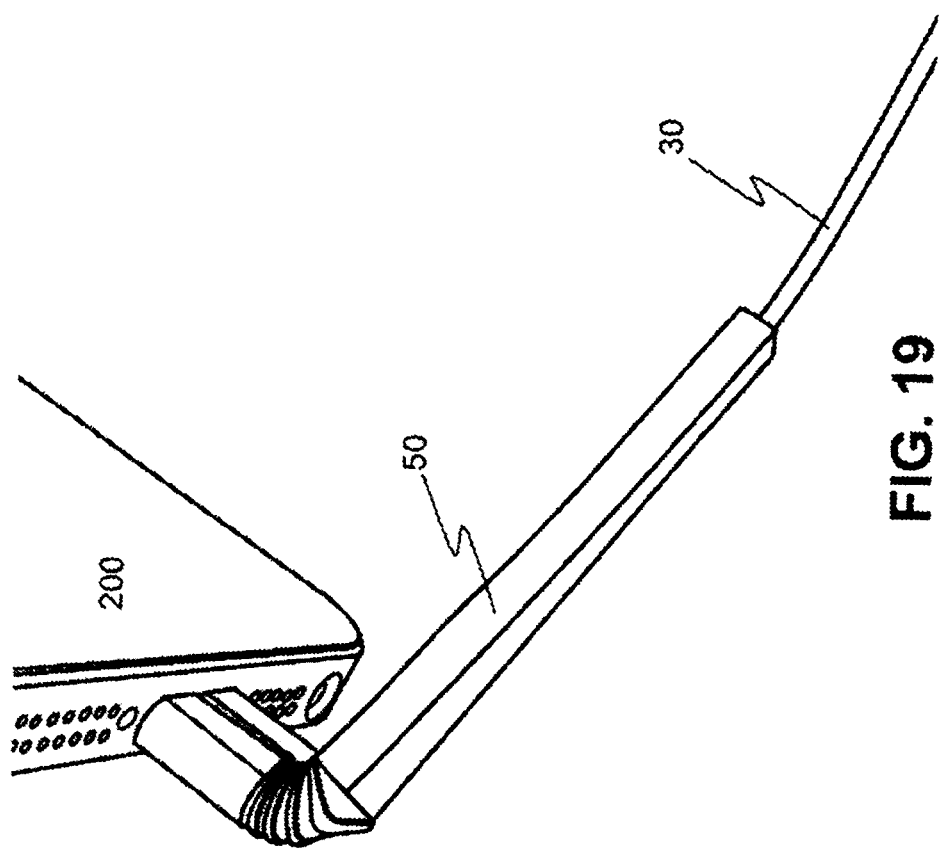
FIG. 19 is an isometric rear view of a flex and stay cell phone/electronic device charging stand connected to a cell phone wherein the sleeve attached UBS cord is bent towards the flat surface.
Figure 20:
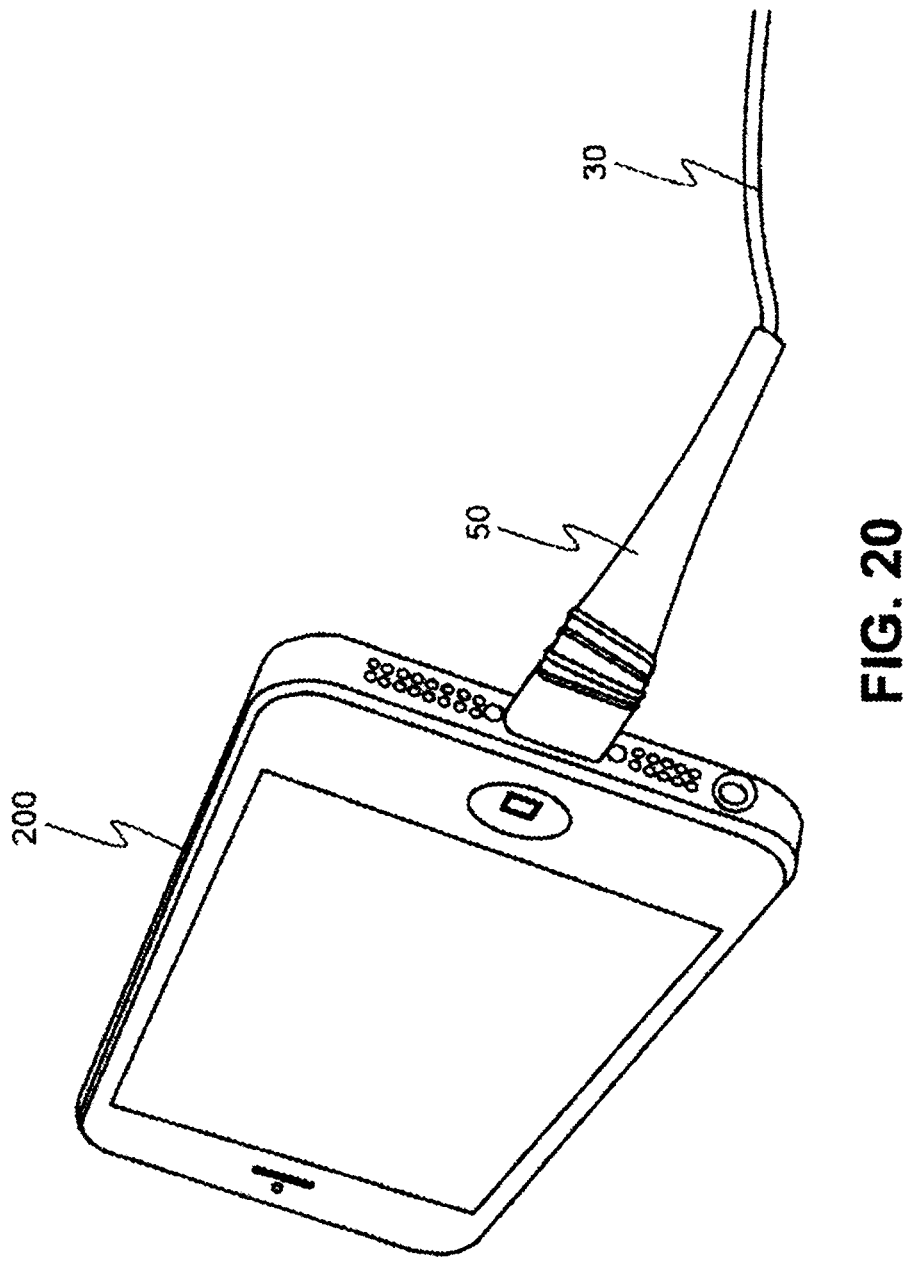
FIG. 20 is a zoomed out view of FIG. 18.

As shown in FIGS. 14-15, a cell phone cannot stand steadily when it is charged using a typical USB cable without being supported by a stand. Whereas when the USB cord is encircled by the removably attachable sleeve 50 as shown in FIGS. 16-20, the USB cable can be bent to create a stand to support the cell phone on a flat surface. FIG. 17 is an isometric front view of a flex and stay cell phone/ electronic device charging stand connected to a cell phone wherein the sleeve attached UBS cord is bent in about 90 degree angle. FIG. 18 is an isometric front view of a flex and stay cell phone/electronic device charging stand connected to a cell phone wherein the sleeve attached UBS cord is bent towards the flat surface. FIG. 19 is an isometric rear view of a flex and stay cell phone/electronic device charging stand connected to a cell phone wherein the sleeve attached UBS cord is bent towards the flat surface. FIG. 20 is a zoomed out view of FIG. 18.

Figure 21:
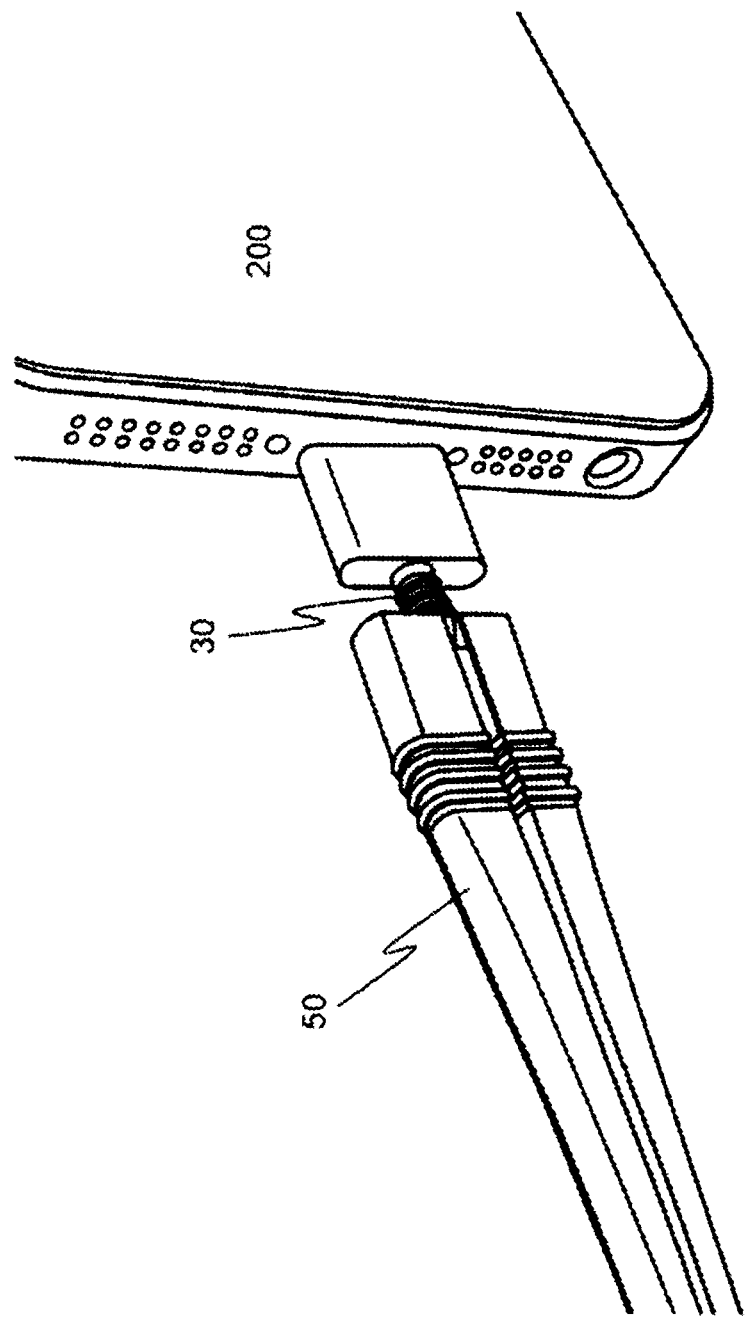
FIG. 21 is an isometric rear view of a flex and stay cell phone/electronic device charging stand connected to a cell phone wherein the removably attachable sleeve partially encircles the UBS cable.
Figure 22:
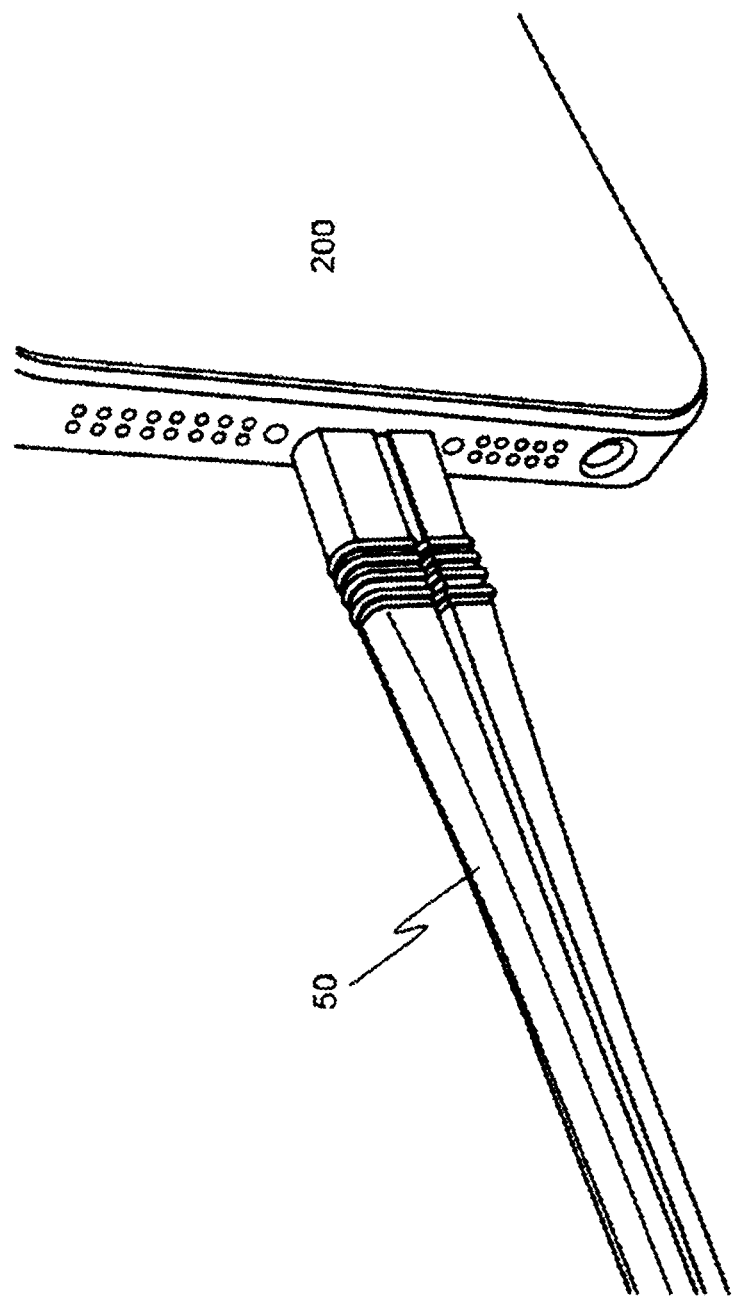
FIG. 22 is an isometric rear view of a flex and stay cell phone/electronic device charging stand connected to a cell phone wherein the removably attachable sleeve completely encircles the UBS cable.
Figure 23:
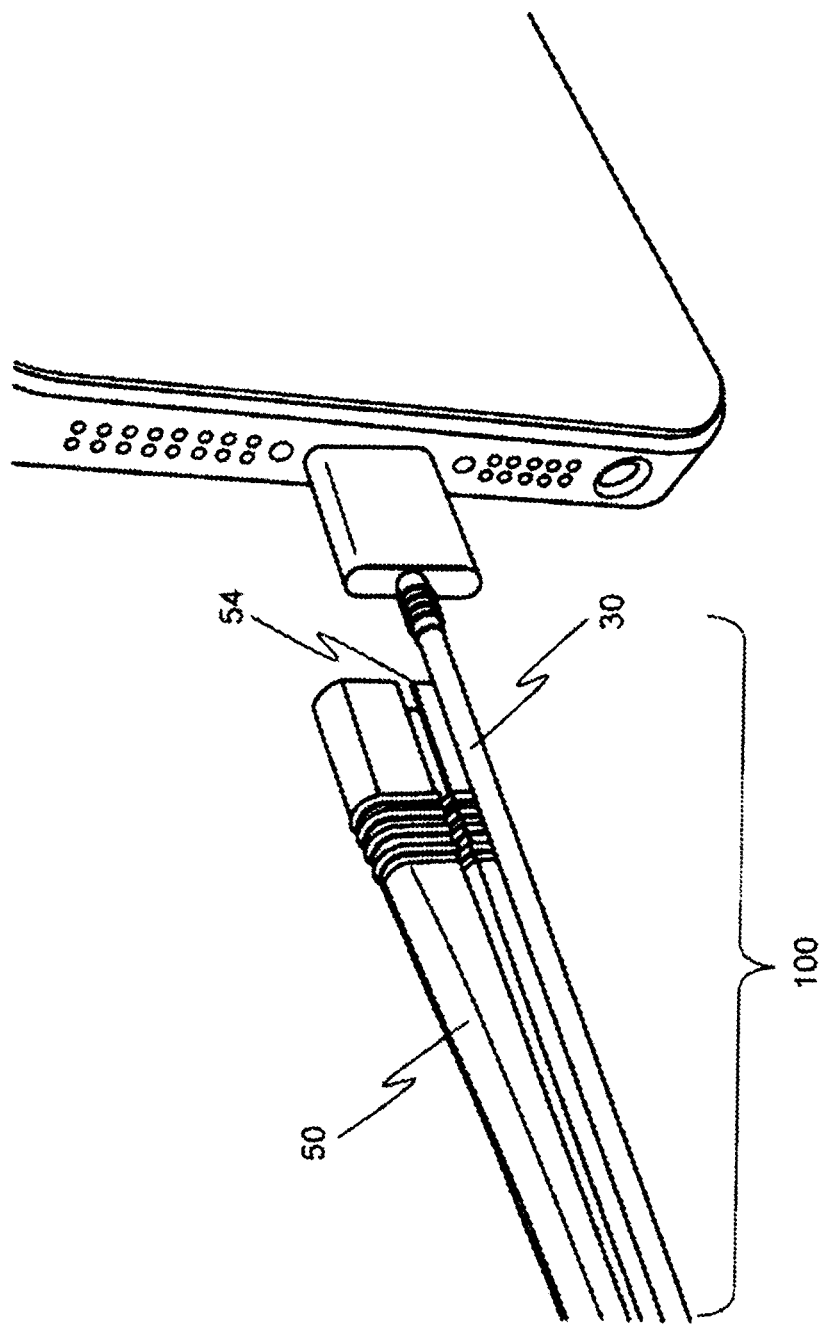
FIG. 23 is an isometric rear view of a flex and stay cell phone/electronic device charging stand connected to a cell phone wherein the removably attachable sleeve is separate from the UBS cable.

FIGS. 21-22 show the rear view of the removably attachable sleeve 50 attached to the USB cord 30. FIG. 21 is an isometric rear view of a flex and stay cell phone/electronic device charging stand connected to a cell phone wherein the removably attachable sleeve partially encircles the UBS cable. FIG. 22 is an isometric rear view of a flex and stay cell phone/electronic device charging stand connected to a cell phone wherein the removably attachable sleeve completely encircles the UBS cable. FIG. 23 is an isometric rear view of a flex and stay cell phone/electronic device charging stand connected to a cell phone wherein the removably attachable sleeve is separate from the UBS cable. FIG. 23 shows the rear view of the removably attachable sleeve 50 which is completely separate from the UBS cord 30. The groove 54 on the rear side along the length of the removably attachable sleeve 50 is clearly observed in FIG. 23.

Figure 24:
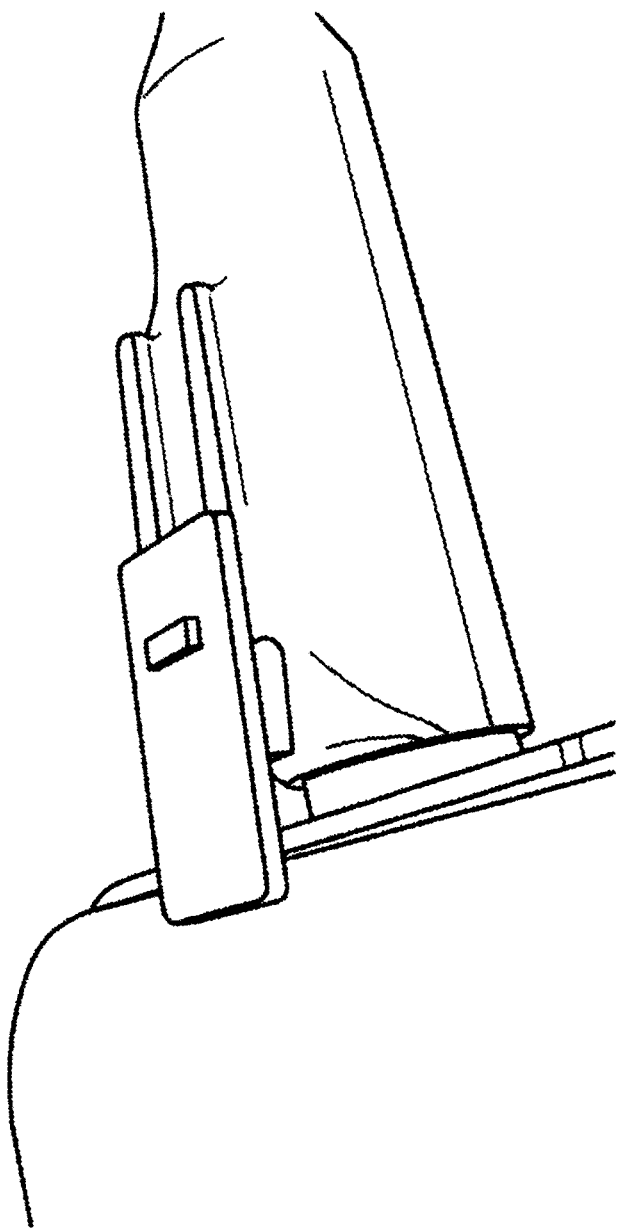
FIG. 24 shows a support clip extending along the flex and stay device.

FIG. 24 shows a support clip extending along the flex and stay device. This support clip when closed is flush with the wire cable itself. Yet here in the open position it extends beyond the tip of the wire and positions itself along the electronic device framing itself. This feature allows for added support for the wire and distributes the pressure away from the port opening where too much pressure could cause damage to the electronic device.

Figure 25:
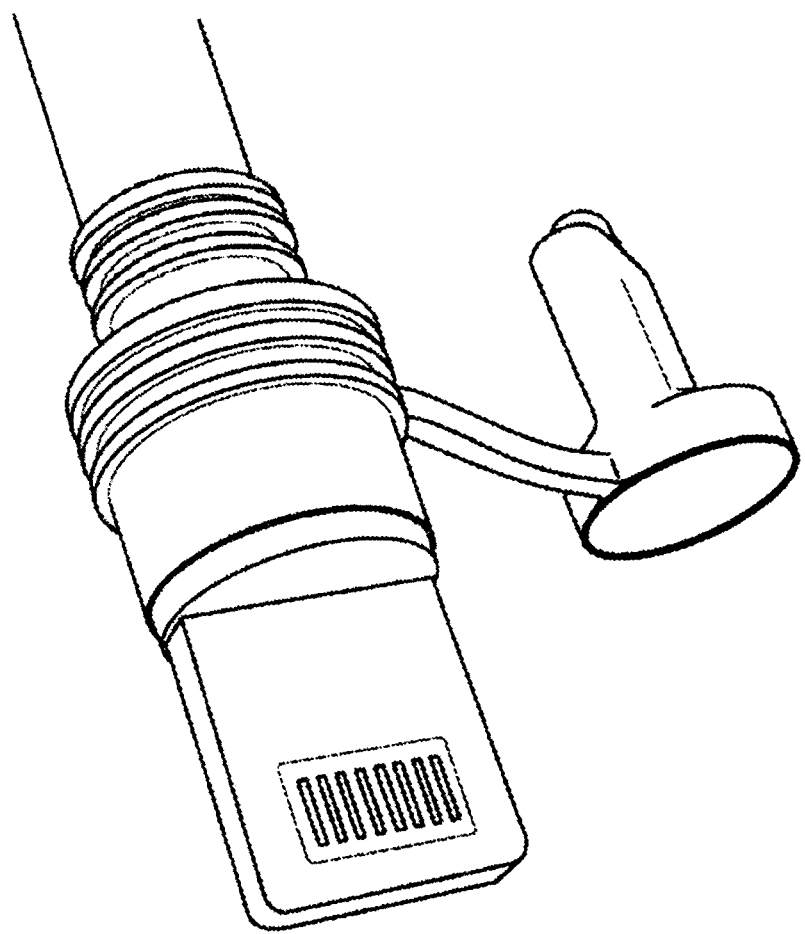
FIG. 25 shows an open cap tip protection covering with a stylist feature.

FIG. 25 shows an open cap tip protection covering with a stylist feature. A stylist is therefore at hand for use by the electronic device owner.

Figure 26:
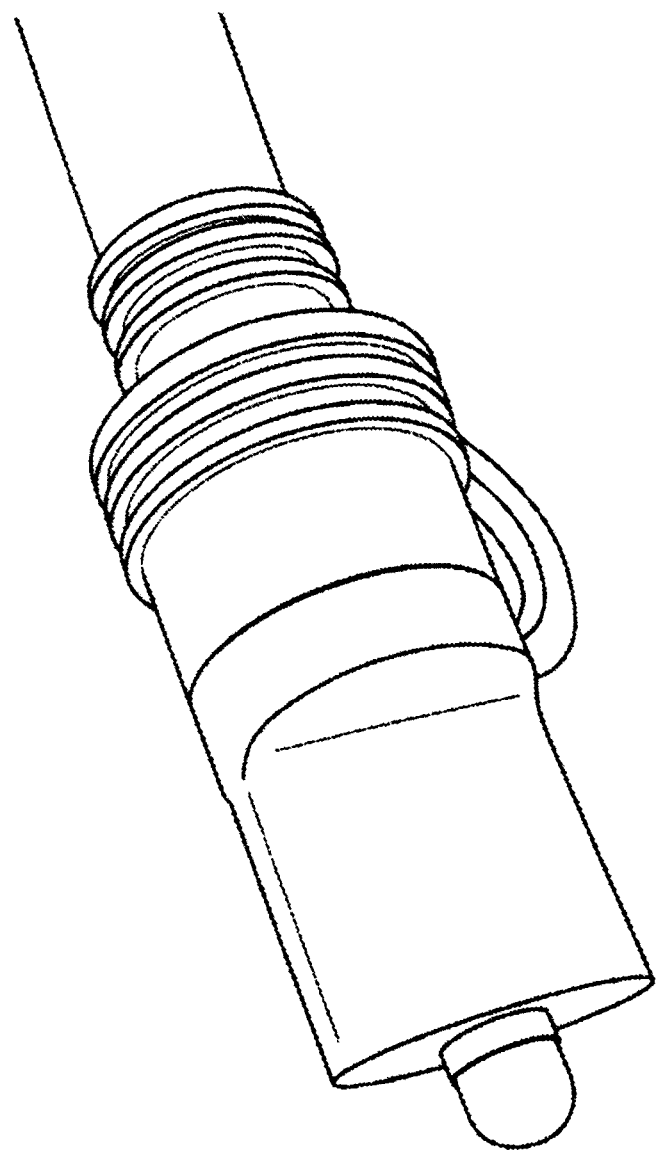
FIG. 26 shows a closed cap tip protection covering with a stylist feature.

FIG. 26 shows a closed cap tip protection covering with a stylist feature. Since the flex and stay wire is firm like a pen this stylist could be used as a handy feature.

Figure 27:
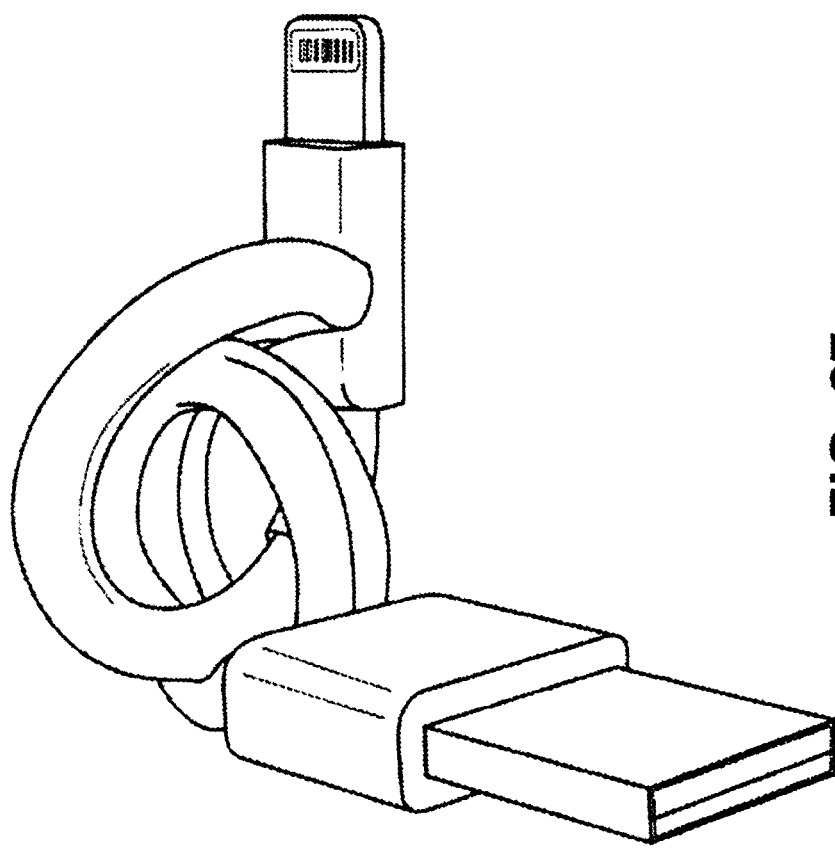
FIG. 27 shows a wrapping of the cord for neat storage using the flex and stay end portion as a bent holding feature.

FIG. 27 shows a wrapping of the cord for neat storage using the flex and stay end portion as a bent holding feature.

Figure 28:
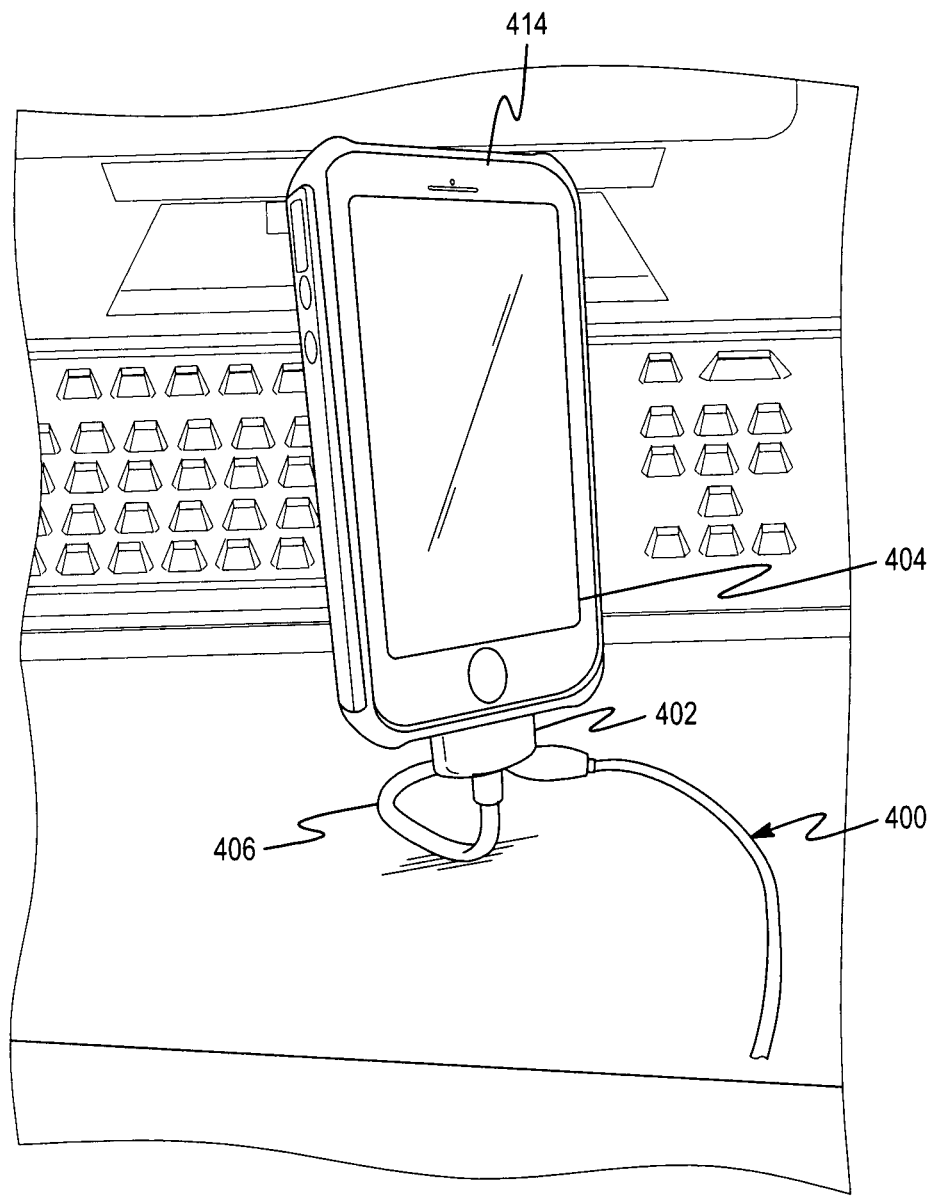
FIG. 28 is an isometric front view of a cable according to an embodiment in which the cable is illustrated as supporting a cell phone in a predetermined position.

Referring now to FIG. 28, there is illustrated a cable 400 having at least one connector 402 at one end thereof for electrically (or otherwise operationally) connected to an electronic device 404 (in this case, a cell phone). The connector 402 can connect to the electronic device to facilitate in carrying out any operational function of the electronic device, such as charging an internal battery of the device, connecting the electronic device to another device, such as a computer, or outputting a signal, such as reproduction of sound. At least a portion 406 of a longitudinal length of the cable, has an increased rigidity in its flexibility such that at least such portion 406 of the cable can be shaped to support the electronic device in a predetermined position, such as being upright as shown in FIG. 28. The means by which the at least portion 406 of the cable 400 achieves such rigidity can be by the addition of a rigid and flexible member, such as an additional wire, mesh, helix, which when shaped into a predetermined shape, can remain in such shape to support the weight of the electronic device connected thereto.

Figure 29A:
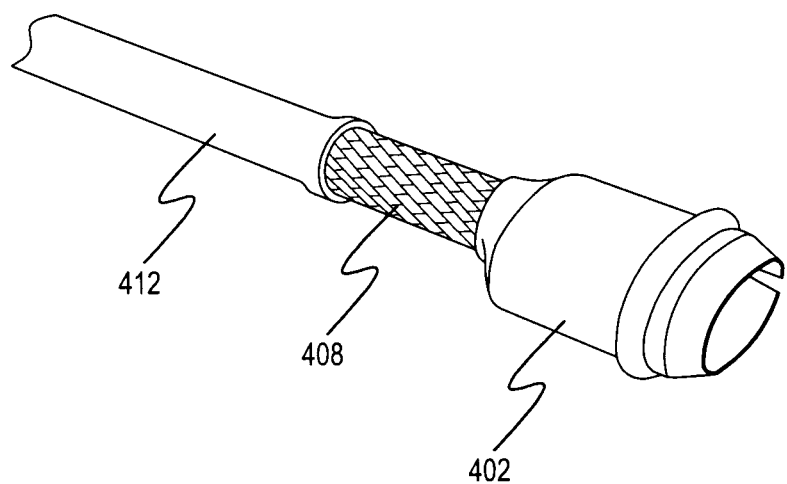
FIGS. 29A and 29B illustrate alternative configurations of the cable of FIG. 28.
Figure 29B:
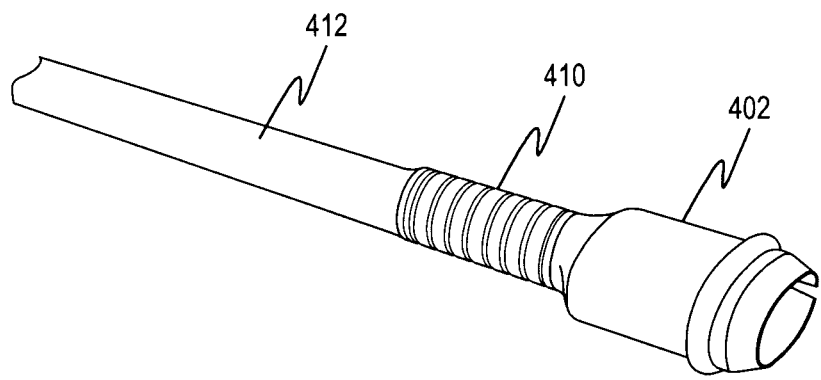
Figure 30:
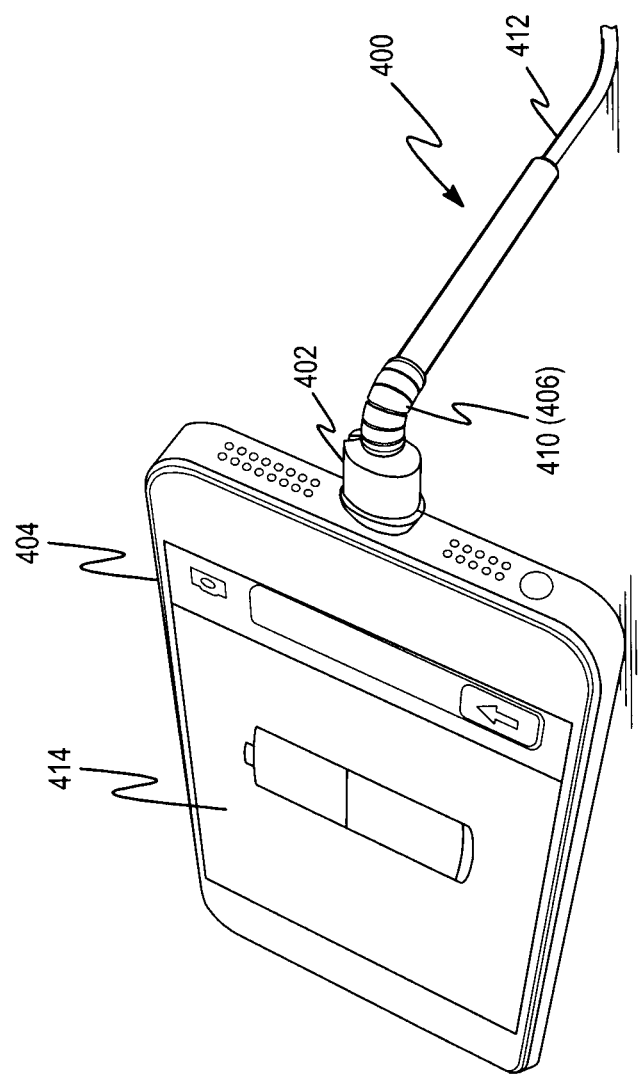
FIG. 30 illustrates one of the cables of FIG. 29, in which the cable is illustrated as supporting a cell phone in a predetermined position.

Referring now to FIGS. 29A and 29B, the same illustrates two examples of the means to provide the increased rigidity in the cable. FIG. 29A illustrates a braided portion 408 provided proximate to the connector 402, while FIG. 29B illustrates a series of interconnected annular rings 410 also provided proximate to the connector 402. The braided portion 408 and/or the series of interconnected annular rings 410 are configured such that they provide the added rigidity as compared to the remainder of the cable 412 and function to support the weight of the electronic device 404 in a predetermined position. The braided portion 408 and/or the series of interconnected annular rings 410 can be exposed as illustrated in FIGS. 29A and 29B or covered with sheathing, which can be the same sheathing that covers the other portions of the cable. FIG. 30 illustrates the cable of FIG. 29B which the series of interconnected annular rings 410 (as the at least portion having an increased rigidity 406) being flexed into a position such that the electronic device 404 is tilted to view the display screen 414 in a landscape orientation (as opposed to the orientation of the display screen 414 in FIG. 28).

Figure 31:
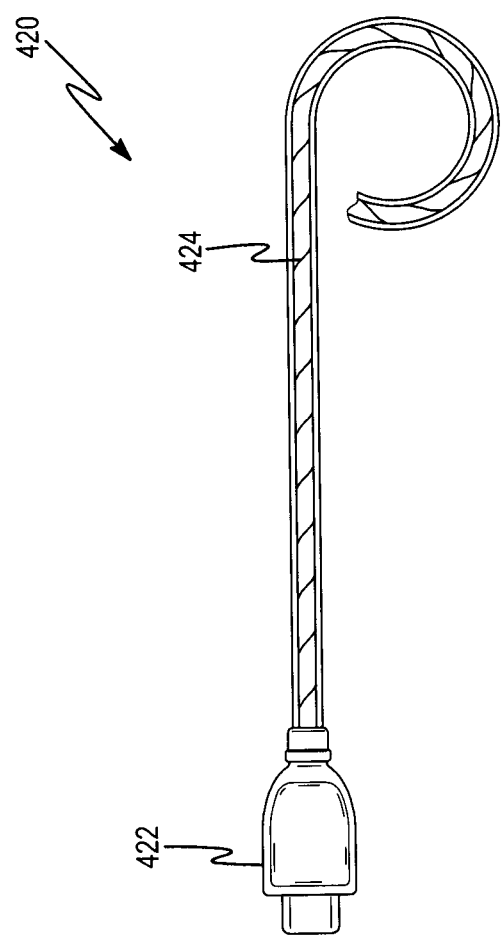
FIG. 31 illustrates a cable having a uniform flexibility characteristic along its length.
Figure 32:
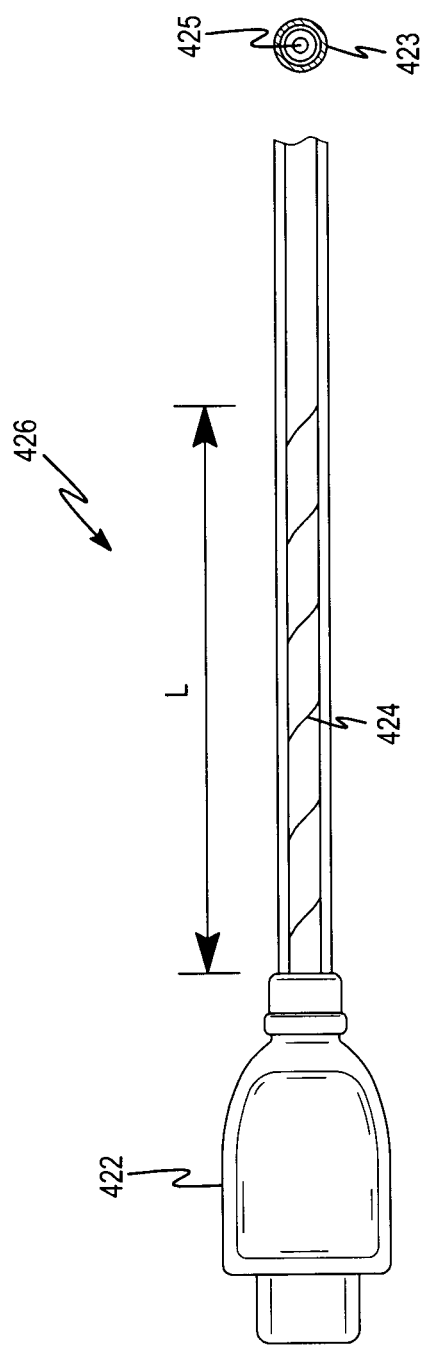
FIG. 32 illustrates a cable having a flexibility characteristic along a portion of its length.

Referring now to FIG. 31, there is shown a portion of a cable 420, having a connector 422 for connection to an electronic device and for use with the electronic device. In the configuration illustrated in FIG. 31, the means for achieving the added flexibility in the cable 420 such that the cable can be flexed into a predetermined position to support the electronic device into a predetermined position, is a spirally wound metallic wire 424, which can be internal or external to the external sheath of the cable. Furthermore, as shown in FIG. 31, such wire 424 can be disposed along an entire longitudinal length of the cable 420, or along a predetermined portion (length "L") thereof, as shown in the cable 426 of FIG. 32. FIG. 32 further illustrates a sectional view of the cable showing an internal elongated conductor 425 for electrically connecting to the electronic device via the connector 422 and an insulting sheath 423 for electrically insulating the conductor 425.

Figure 33:
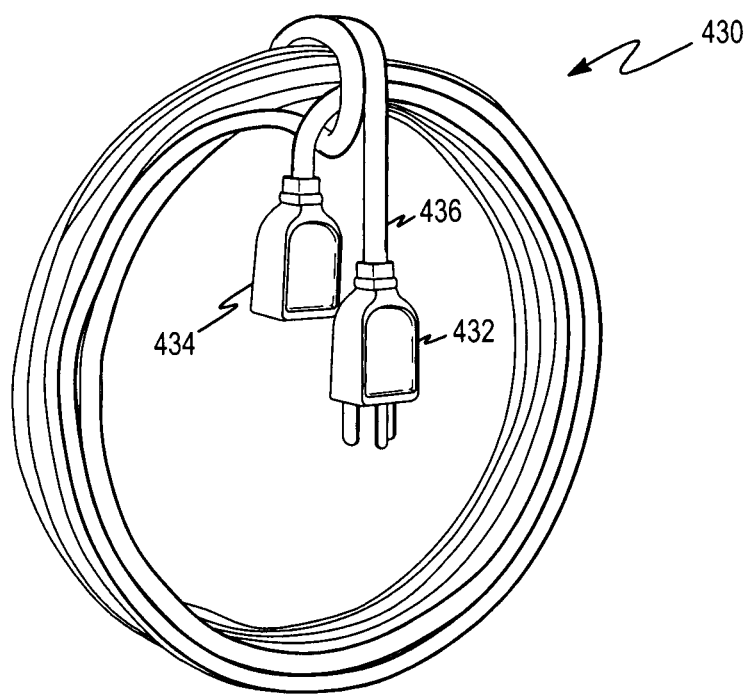
FIG. 33 illustrates a cable having a flexibility characteristic such that the cable can support itself in a predetermined position.
Figure 34:
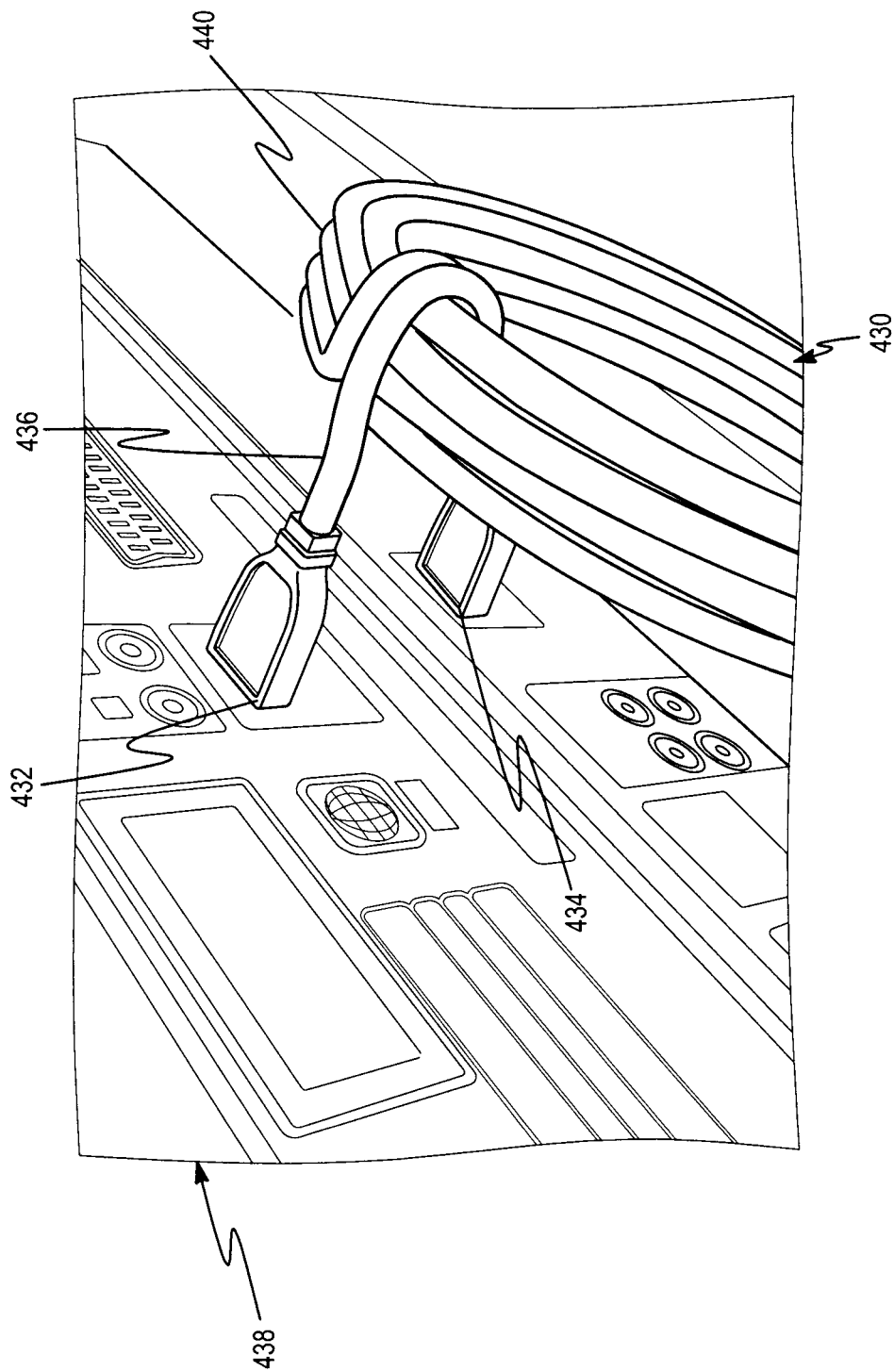
FIG. 34 illustrates the cable of FIG. 33 in which the cable is connected to one or more electronic devices and supporting itself in a predetermined position.

Referring now to FIG. 33, there is illustrated another embodiment of a cable 430, having connectors 432, 434 at each end thereof for connection to one or more electronic devices. The cable 430, has a portion 436 at at least one of such ends that has added flexibility such that the cable can be flexed into a predetermined position, in this case, to wrap around itself and to maintain such shape. As shown in FIG. 34, the connectors 432, 434 of the cable 430 are shown plugged into a corresponding connector on one or more electronic devices 438 with the portion 436 being shaped to wrap the remaining portions 440 into a neatly coiled bundle and to maintain such shape. Thus, in addition to supporting the electronic device in a predetermined position, as described above with regard to cables 400, 420, 426, the portion 436 of cable 430 is useful to maintain the cable itself in a predetermined configuration, such as in a neatly coiled shape to prevent excess portions 440 of the cable from being unsightly and messy.

Figure 35:
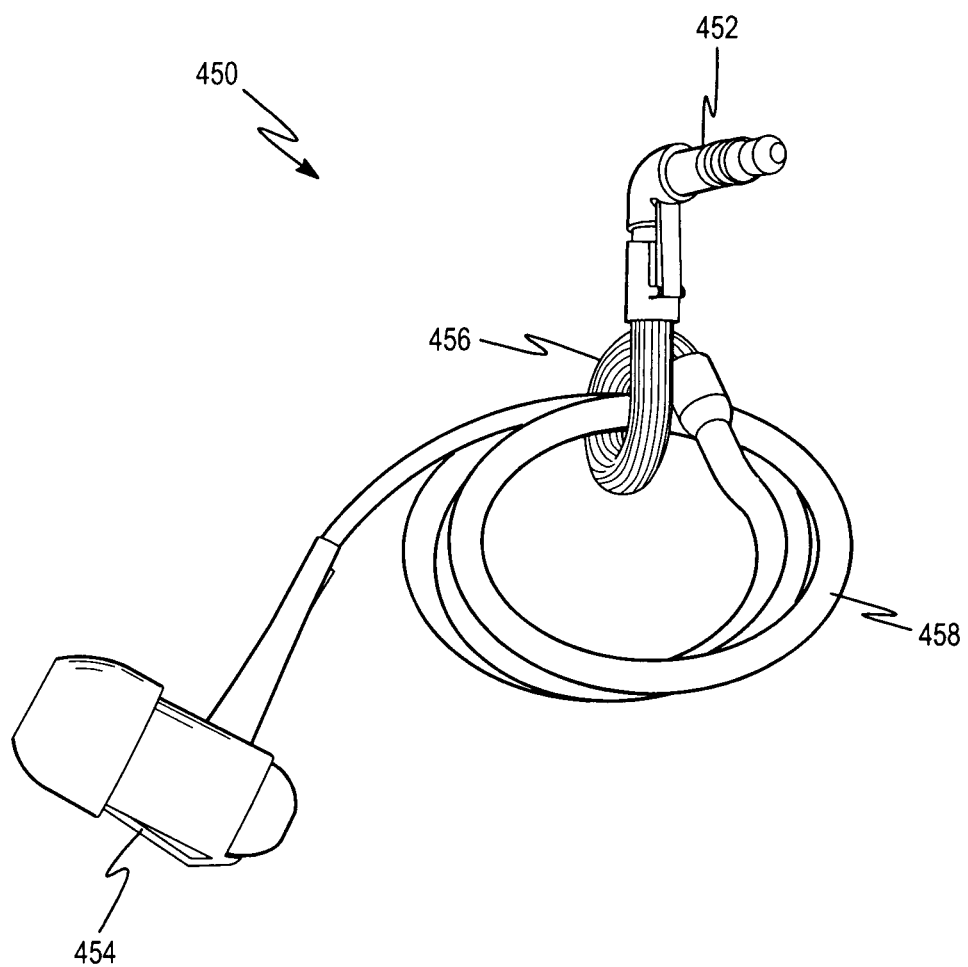
FIG. 35 illustrates a cable, in the form of headphones, having a flexibility characteristic such that the headphones can support itself in a predetermined position.
Figure 36:
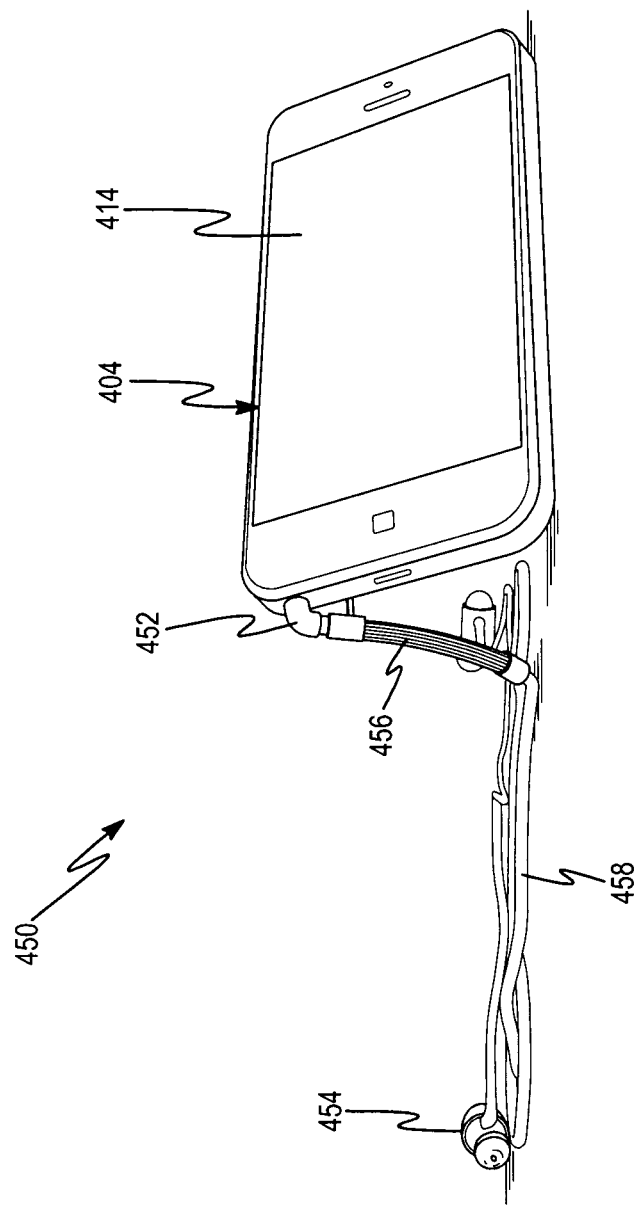
FIG. 36 illustrates the headphones of FIG. 35 in which the headphones supports an electronic device, in the form of a cell phone, in a predetermined position.

Referring now to FIG. 35, there is shown another embodiment of a cable 450 having a connector 452 at one end thereof. The connector 452 is configured as a headphones jack for connection to a mating female connector, such as those typically found on cell phones. Another end of the cable 450 includes one or more ear buds 454 for reproducing sound from the electronic device connected by way of the connector 452. The cable 450 includes at least a portion 456 having increased rigidity so as to be able to be shaped into a predetermined configuration and to maintain such configuration against a predetermined load. The portion 456 can be used to maintain the remaining portions 458 of the cable into a neat coil as shown in FIG. 35 or to support an electronic device 404 in a predetermined position, such as propped up so as to view the display 414 in a landscape configuration. The portion 456 can be configured in any of the ways discussed above for providing the additional rigidity, yet provide enough flexibility so that the portion 456 can be shaped into a predetermined configuration.

As described above, the means for providing the cable with the added rigidity to support an electronic device in a predetermined position and/or to support itself in a predetermined configuration can be a wire, wire mesh, metallic spiral rings etc. disposed along a longitudinal direction of the portion of the cable desired to have such features, including the entire length thereof. Furthermore, such means can be exposed, disposed interior to an outer sheathing or embedded into the sheathing of the cable. Still further, an additional sheathing may be provided for such means so that the means is disposed between an interior sheathing of the cable and the additional exterior sheathing for covering the means for the entire length of the cable or portion thereof. Where such means is a wire, the same can be linearly disposed along the length of the cable or wound in a helix around the conductor and/or sheathing of the cable. The density of the turns of the wire helix can be greater (tighter turns) or lesser (looser turns) depending on desired characteristics. For example, tighter turns may be used for increased maneuverability and load bearing and looser turns for when there is less repeated movement. The wire can be formed of a metal, such as aluminum or copper and can be about 16-20 gauge to support a typical smart phone type cell phone. The number of wires, wire diameter, wire material etc. can be varied depending in the desired characteristics.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A cable comprising:
   a body having one or more elongated conductors and an electrically insulating sheathing covering the elongated conductor; and
   a connector disposed at at least one end for electrically connecting the elongated conductor to an electronic device;
   wherein at least a portion of the body has a rigidity such that the portion can be shaped into a predetermined configuration and maintained in the predetermined configuration when supporting the electronic device in a predetermined position.

2. The cable of claim 1, wherein the electronic device is a cell phone and the connector is a cell phone connector for one of charging an internal battery of the cell phone or connecting the cell phone to another electronic device.

3. The cable of claim 1, wherein the connector is a headphone jack for connecting to a mating headphone connector on the electronic device.

4. The cable of claim 3, wherein another end of the body includes one or more ear buds for reproducing sound from the electronic device.

5. The cable of claim 1, wherein the at least a portion of the body is proximate to the connector.

6. The cable of claim 1, wherein the at least a portion of the body is an entire length of the body in a longitudinal direction.

7. The cable of claim 1, wherein the at least a portion of the body is a metallic wire spirally wound around the elongated conductor.

8. The cable of claim 1, further comprising another connector disposed at another end of the body for connecting to one of the same or a different electronic device.

* * * * *